United States Patent
Kurihara et al.

(10) Patent No.: US 9,975,485 B2
(45) Date of Patent: May 22, 2018

(54) SURROUNDINGS MONITORING SYSTEM, WORK VEHICLE, AND SURROUNDINGS MONITORING METHOD

(71) Applicant: Komatsu Ltd., Tokyo (JP)

(72) Inventors: Takeshi Kurihara, Hiratsuka (JP); Yukihiro Nakanishi, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 246 days.

(21) Appl. No.: 14/382,326

(22) PCT Filed: Apr. 25, 2014

(86) PCT No.: PCT/JP2014/061802
§ 371 (c)(1),
(2) Date: Sep. 1, 2014

(87) PCT Pub. No.: WO2015/162801
PCT Pub. Date: Oct. 29, 2015

(65) Prior Publication Data
US 2016/0236616 A1    Aug. 18, 2016

(51) Int. Cl.
| | |
|---|---|
| B60R 1/00 | (2006.01) |
| E02F 9/24 | (2006.01) |
| G01S 7/12 | (2006.01) |
| G06K 9/00 | (2006.01) |
| G01S 7/40 | (2006.01) |
| B60P 1/04 | (2006.01) |

(Continued)

(52) U.S. Cl.
CPC .................. *B60R 1/00* (2013.01); *E02F 9/24* (2013.01); *G01S 7/12* (2013.01); *G01S 7/40* (2013.01); *G06K 9/00805* (2013.01); *B60P 1/04* (2013.01); *B60P 1/283* (2013.01); *B60R 2300/8093* (2013.01); *G01S 2013/9332* (2013.01)

(58) Field of Classification Search
CPC .... B60R 1/00; B60R 2300/8093; H04N 7/18; H04N 7/181; G08G 1/16; G08G 1/166; E02F 9/264; E02F 9/24; E02F 9/26; F01N 2590/08; G01S 13/931; G01S 7/12; G01S 2013/9332; G06K 9/00805; B60P 1/04
USPC ..................... 701/28; 348/119, 153; 382/104
See application file for complete search history.

(56) References Cited

U.S. PATENT DOCUMENTS

| | | |
|---|---|---|
| 6,127,964 A | 10/2000 | Kageyama |
| 7,592,928 B2 | 9/2009 | Chinomi et al. |
| 2006/0274147 A1 | 12/2006 | Chinomi et al. |

(Continued)

FOREIGN PATENT DOCUMENTS

| | | |
|---|---|---|
| AU | 2012372155 A1 | 4/2014 |
| CN | 1878299 A | 12/2006 |

(Continued)

OTHER PUBLICATIONS

International Search Report and Written Opinion dated Aug. 5, 2014, issued for PCT/JP2014/061802.

*Primary Examiner* — Neil Mikeska
(74) *Attorney, Agent, or Firm* — Locke Lord LLP

(57) ABSTRACT

A surroundings monitoring system includes: a detection device that is disposed in a work vehicle and configured to be able to detect an object around the work vehicle; and a display device that is disposed in the work vehicle so as to display the work vehicle on a screen and display a detection area of the detection device in which an abnormality has occurred around the work vehicle on the screen.

10 Claims, 27 Drawing Sheets

(51) Int. Cl.
*G01S 13/93* (2006.01)
*B60P 1/28* (2006.01)

(56) References Cited

U.S. PATENT DOCUMENTS

| | | | |
|---|---|---|---|
| 2011/0006891 A1* | 1/2011 | Cho | H04N 7/18 |
| | | | 340/441 |
| 2012/0242505 A1 | 9/2012 | Maeda et al. | |
| 2013/0088596 A1* | 4/2013 | Raita | B60R 1/00 |
| | | | 348/148 |
| 2013/0147958 A1* | 6/2013 | Mitsuta | B60R 1/00 |
| | | | 348/148 |
| 2013/0242098 A1* | 9/2013 | Hahne | G08G 1/04 |
| | | | 348/148 |
| 2013/0265431 A1* | 10/2013 | Hattori | H04N 7/18 |
| | | | 348/148 |
| 2016/0057354 A1* | 2/2016 | Shigemura | B60R 1/00 |
| | | | 348/148 |

FOREIGN PATENT DOCUMENTS

| | | |
|---|---|---|
| CN | 102754138 A | 10/2012 |
| JP | 11-099894 A | 4/1999 |
| JP | 11-264871 A | 9/1999 |
| JP | 2008-095307 A | 4/2008 |
| JP | 2008-248613 A | 10/2008 |
| JP | 2010-210412 A | 9/2010 |
| JP | 2013-159930 A | 8/2013 |
| JP | 2013-242172 A | 12/2013 |
| JP | 2014-025272 A | 2/2014 |
| JP | 2014-064192 A | 4/2014 |

\* cited by examiner

SURROUNDINGS MONITORING SYSTEM, WORK VEHICLE, AND SURROUNDINGS MONITORING METHOD

CROSS REFERENCE TO RELATED APPLICATIONS

This application is related to co-pending application: "SURROUNDINGS MONITORING SYSTEM, WORK VEHICLE, AND SURROUNDINGS MONITORING METHOD" filed even date herewith in the names of Takeshi Kurihara and Yukihiro Nakanishi as a national phase entry of PCT/JP2014/061801, which application is assigned to the assignee of the present application and is incorporated by reference herein.

FIELD

The present invention relates to a surroundings monitoring system, a work vehicle, and a surroundings monitoring method.

BACKGROUND

In an excavation site of a mine, a work vehicle such as a dump truck and an excavator is operated. The work vehicle used in a mine has a big size. Due to this, surroundings monitoring system has been proposed, which monitors surroundings of a work vehicle using a detection device capable of detecting an object around the work vehicle so that an operator can easily recognize the situation of the surroundings with the aid of side mirrors or the like. An example of a surroundings monitoring apparatus which uses a camera is disclosed in Patent Literature 1.

CITATION LIST

Patent Literature

Patent Literature 1: Japanese Laid-open Patent Publication No 2008-248613

SUMMARY

Technical Problem

In the surroundings monitoring system, it is preferable that a situation in which the detection device does not operate properly be recognized by the operator.

Some aspects of the present invention aim to provide a surroundings monitoring system, a work vehicle, and a surroundings monitoring method capable of assisting in recognition of states of a detection device.

Solution to Problem

A first aspect of the present invention provides a surroundings monitoring system comprises: a detection device that is disposed in a work vehicle and configured to be able to detect an object around the work vehicle; and a display device that is disposed in the work vehicle so as to display the work vehicle on a screen and display a detection area of the detection device in which an abnormality has occurred around the work vehicle on the screen.

According to the first aspect of the present invention, the surroundings monitoring system preferably includes: a detection device that is disposed in a work vehicle and configured to be able to detect an object around the work vehicle; and a display device that is disposed in the work vehicle so as to display the work vehicle on a screen and display a detection area of the detection device in which an abnormality has occurred around the work vehicle on the screen.

In the first aspect of present invention, it is preferable that the surroundings monitoring system, further comprises: an image capturing device that is disposed in the work vehicle so as to image an area around the work vehicle, wherein the display device displays a bird's-eye image of the area around the work vehicle generated based on an image capturing result of the image capturing device around the work vehicle and displays the detection area so as to overlap the bird's-eye image.

In the first aspect of present invention, it is preferable that the display device causes the detection area on the screen to blink.

In the first aspect of present invention, it is preferable that the blinking of the detection area includes repeating a display operation of displaying the detection area and a non-display operation of not displaying the detection area, and a period of the non-display operation is longer than a period of the display operation.

In the first aspect of present invention, it is preferable that the display device displays the detection area in a semi-transparent manner so that both the detection area and the bird's-eye image are visible in a state where the detection area and the bird's-eye image overlap.

In the first aspect of present invention, it is preferable that the display device displays the detection area of the detection device in which the abnormality has occurred and a detection area of a normal detection device that has detected an object in different forms.

In the first aspect of present invention, it is preferable that a plurality of detection devices is disposed so that different areas around the work vehicle are detected, and the display device can display the detection area of the detection device in which the abnormality has occurred and the detection area of the normal detection device that has detected the object among the plurality of detection devices in different forms at a same time.

A second aspect of the present invention provides a work vehicle comprising the surroundings monitoring system according to the first aspect of present invention.

A third aspect of the present invention provides a surroundings monitoring method comprising: detecting an object around a work vehicle using a detection device disposed in the work vehicle; and displaying the work vehicle on a screen of a display device disposed in the work vehicle and displaying a detection area of the detection device in which an abnormality has occurred around the work vehicle on the screen.

Advantageous Effects of Invention

According to the aspects of the present invention, it is possible to assist in recognition of states of a detection device.

DESCRIPTION OF EMBODIMENTS

Hereinafter, although embodiments of the present invention are described with reference to the drawings, the present invention is not limited to this. In the following description, the front, rear, left, and right sides are defined based on the driver's seat. The front side is a front side of the line of sight of an operator seating on a driver's seat and is a direction from the driver's seat to the steering wheel. The rear side is a direction opposite to the front side and is a direction from the steering wheel to the driver's seat. A vehicle width direction of a work vehicle is identical to a left-to-right direction of the work vehicle.

<Work Vehicle>

Figure 1:
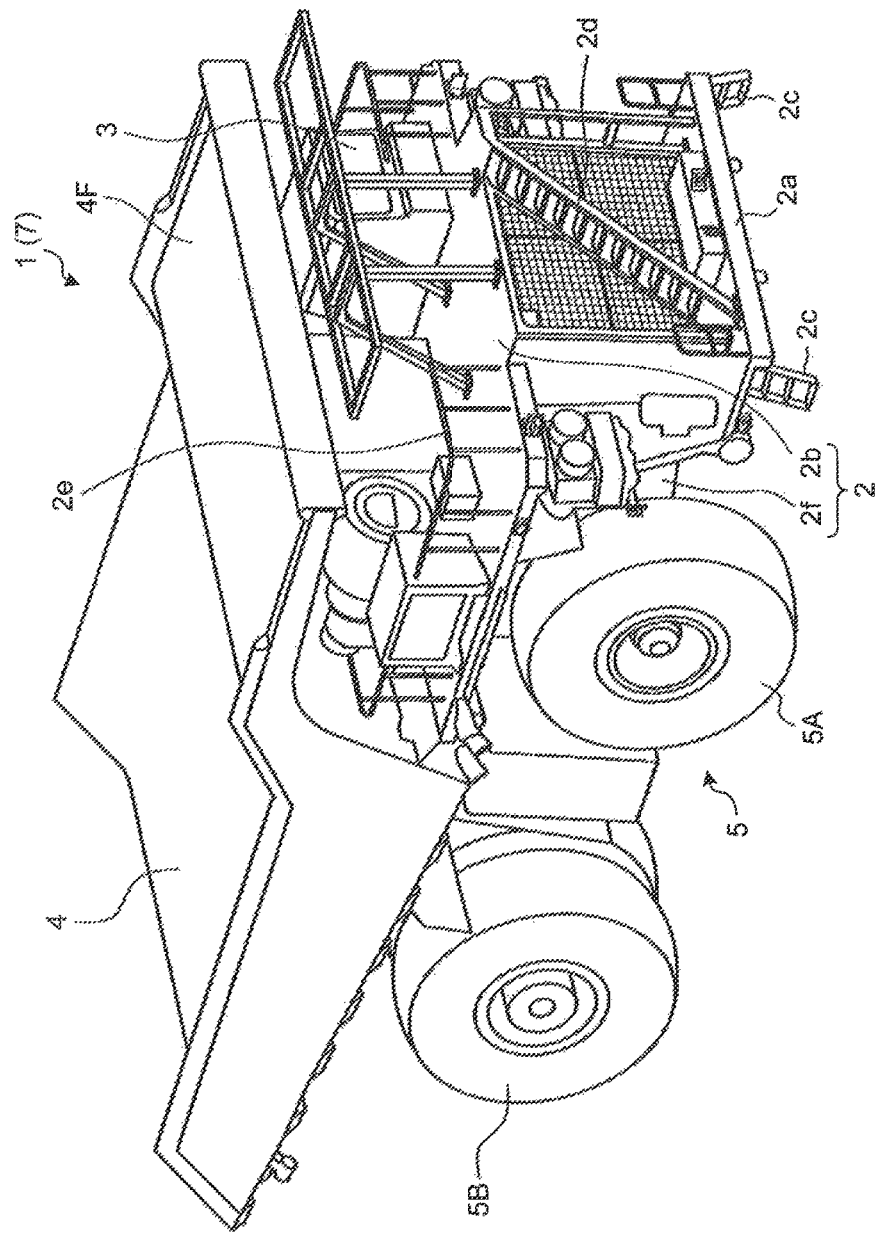
FIG. 1 is a perspective view illustrating an example of a work vehicle according to the present embodiment.

FIG. 1 is a perspective view illustrating an example of a work vehicle 1 according to the present embodiment. In the present embodiment, an example in which the work vehicle 1 is a dump truck (off-road dump truck) 1 will be described. The dump truck 1 is a self-propelled vehicle used for operations in a mine. The dump truck 1 may be a rigid frame-type dump truck or an articulated-type dump truck.

As illustrated in FIG. 1, the dump truck 1 includes a vehicle body 2, a cab 3 provided in the vehicle body 2, a vessel 4 which is supported on the vehicle body 2 and on which a freight is loaded, and a traveling device 5 capable of moving while supporting the vehicle body 2.

Moreover, the dump truck 1 includes a surroundings monitoring system 7 for monitoring the surroundings of the dump truck 1 to allow an operator to recognize a situation of the surroundings of the dump truck 1.

The traveling device 5 includes front wheels 5A and rear wheels 5B. The traveling device 5 operates with power generated by a power generator that is provided in the dump truck 1. The power generator includes at least one of an internal combustion engine such as a diesel engine and an electric motor.

In the present embodiment, the dump truck 1 employs a diesel electric drive system. The dump truck 1 includes a diesel engine, a generator driven with power that is generated by the diesel engine, and an electric motor driven by electric power that is generated by the generator. The traveling device 5 travels with power transmitted from the electric motor.

Power generated by an internal combustion engine may be transmitted to the traveling device 5 via a power train, whereby the traveling device 5 travels. An electric motor may be driven with electric power supplied from an overhead line via a trolley, and the traveling device 5 may travel with power transmitted from the electric motor.

The vehicle body 2 includes an upper deck 2b and a frame 2f disposed in a front-to-rear direction. The frame 2f supports the power generator and the traveling device 5 that includes the front wheels 5A and the rear wheels 5B. The frame 2f includes a lower deck 2a and an upper deck 2b. The dump truck 1 has a dual deck structure that includes the lower deck 2a and the upper deck 2b.

The lower deck 2a is disposed below the front surface of the frame 2f. The upper deck 2b is disposed above the lower deck 2a. A movable ladder 2c is disposed below the lower deck 2a. An inclined ladder 2d is disposed between the lower deck 2a and the upper deck 2b. A radiator is disposed between the lower deck 2a and the upper deck 2b. A guardrail 2e is disposed above the upper deck 2b.

The cab 3 is an operating room in which a driver's seat is disposed. The cab 3 is disposed in the upper deck 2b. An operator gets on the cab 3. Various operating devices disposed in the cab 3 are operated by the operator.

The vessel 4 loads freight. For example, freight such as crushed stone at a loading station of a mine is loaded on the vessel 4. The vessel 4 can be elevated and lowered by an actuator such as a hydraulic cylinder. The actuator is disposed between the vehicle body 2 and the vessel and can elevate and lower the vessel 4. The vessel 4 is adjusted by the operation or the actuator so as to take at least one of a loading posture and a standing posture. The loading posture is a posture wherein the front part of the vessel 4 is disposed above the cab 3. The standing posture is a dump posture wherein freight is unloaded. In the present embodiment, the dump truck 1 is a rear dump truck, and freight is unloaded from the vessel 4 when the vessel 4 is tilted toward the rear side. The clump truck 1 may be a side dump truck in which freight is unloaded from the vessel 4 when the vessel 4 is tilted toward the left or right side. The vessel 4 has a flange portion 4F that is called a protector. The flange portion 4F is disposed in a front portion of the vessel 4 and can be disposed above the cab 3. The flange portion 4F protects the cab 3 by being disposed above the cab 3.

<Cab>

Figure 2:
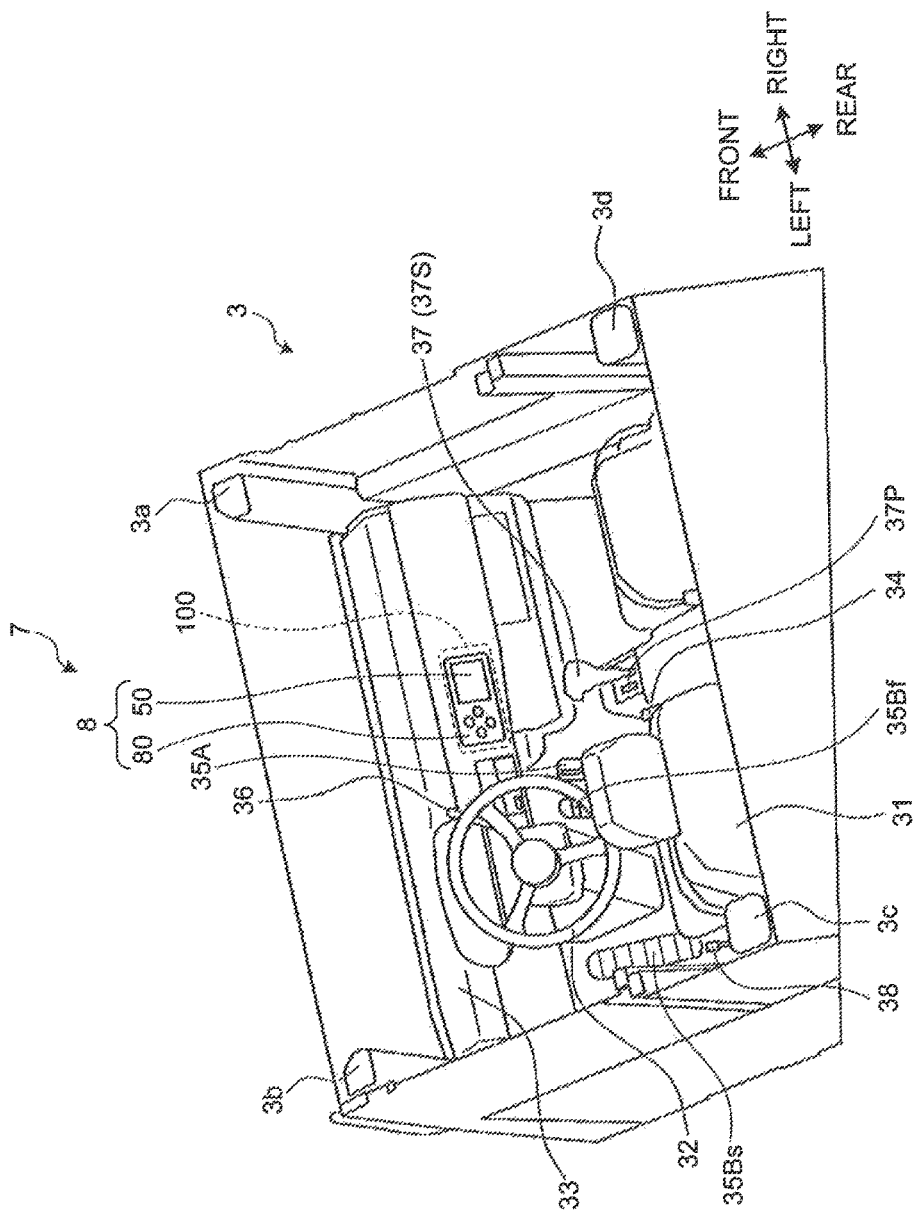
FIG. 2 is a diagram illustrating an example of a cab according to the present embodiment.

Next, the cab 3 according to the present embodiment will be described with reference to FIG. 2. FIG. 2 is a diagram illustrating an example of the cab 3 according to the present embodiment. As illustrated in FIG. 2, the cab 3 includes a roll-over protection system (ROPS) that includes a plurality of posts 3a, 3b, 3c, and 3d. The ROPS protects the operator of the cab 3 when the dump truck 1 rolls over.

In the cab 3, a driver's seat 31, a steering wheel 32, a dash cover 33, a wireless device 34, an accelerator pedal 35A, a brake pedal 35Bf, a secondary brake pedal 35Bs, a retarder 36, a shift lever 37, a shift lever position sensor 37S, a parking brake operating switch 37P, a dump lever 38, an operation panel 8, and a controller 100 are disposed.

An operator sits on the driver's seat 31. The steering wheel 32 is operated by the operator of the driver's seat 31. When the steering wheel 32 is operated, a traveling direction (route) of the traveling device 5 is adjusted. The shift lever 37 is operated by the operator on the driver's seat 31. When the shift lever 37 is operated, the advancing direction (forward or backward direction) of the dump truck 1 is changed. Moreover, when the shift lever 37 is operated, a speed gear is changed.

The operation panel 8 includes an input device 80 that includes a plurality of operation buttons and a display device 50 such as a flat panel display. The display device 50 may be referred to as a monitor. Command signals (input signals and operation signals) generated by operation of the input device 80 are output to the controller 100. The display device 50 displays information output from the controller 100. The surroundings monitoring system 7 includes the controller 100, the input device 80, and the display device 50.

The operation panel 8 may be disposed in the dash cover 33, may be disposed on the dash cover 33, and may be suspended from the ceiling of the cab 3. The operation panel 8 may be disposed at a position that the operator can operate the input device 80 and can see the display device 50. The controller 100 may be disposed at an optional position.

The shift lever position sensor 37S detects the position of the shift lever 37. A detection result of the shift lever position sensor 37S is output to the controller 100. The controller 100 acquires information on a travelling state (travelling mode) of the dump truck 1 based on the detection result of the shift lever position sensor 37S. The travelling state of the dump truck 1 includes at least one of a forward state, a backward state, a neutral state, a parking state, and a gear shifting state.

The parking brake operating switch 37P is operated to operate a parking brake to park the dump truck 1. A command signal generated by operation of the parking brake operating switch 37P is output to the controller 100. The controller 100 acquires information on a travelling state (parking state or not) of the dump truck 1 based on the command signal from the parking brake operating switch 37P.

<Surroundings Monitoring System>

Figure 3:
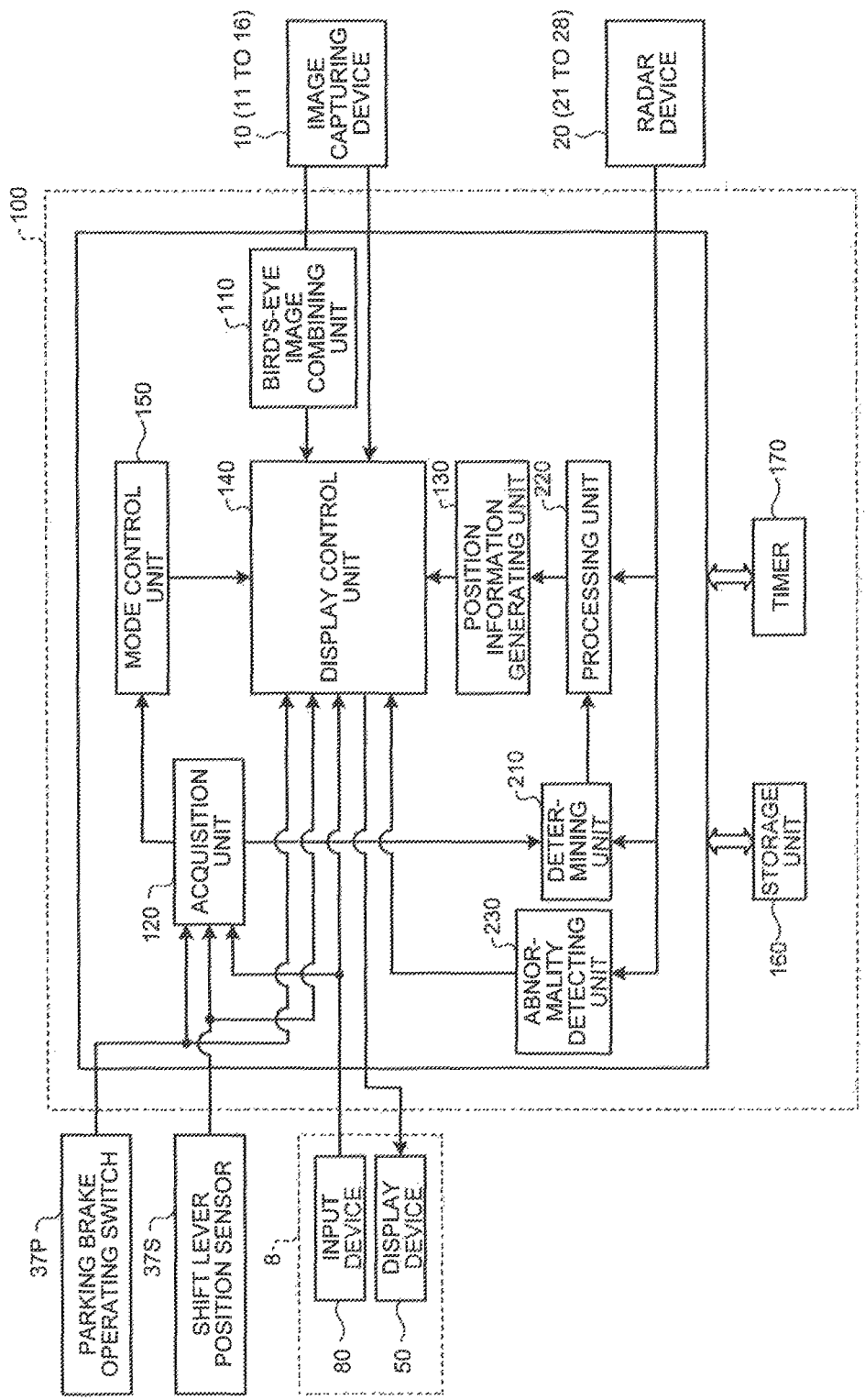
FIG. 3 is a block diagram illustrating an example of a surroundings monitoring system according to the present embodiment.

Next, an overview of the surroundings monitoring system 7 according to the present embodiment will be described with reference to FIG. 3. FIG. 3 is a block diagram illustrating an example of the surroundings monitoring system 7 according to the present embodiment. The surroundings monitoring system 7 monitors the surroundings of the dump truck 1 to allow the operator to recognize the situation of the surroundings of the dump truck 1. The surroundings monitoring system 7 includes, for example, the controller 100, the input device 80 connected to the controller 100, the shift lever position sensor 37S connected to the controller 100, the parking brake operating switch 37P connected to the controller 100, the display device 50 connected to the controller 100, image capturing devices 10 (11 to 16) that are connected to the controller 100 so as to capture the image s of the surroundings of the dump truck 1, and detection devices 20 (21 to 28) that are connected to the controller 100 so as to detect an object around the dump truck 1 in a non-contacting manner. The shift lever position sensor 37S, the parking brake operating switch 37P, and the input device 80 of the operation panel 8 function as an input unit that can generate command signals (input signals and operation signals) for the controller 100.

The image capturing device 10 is disposed in the dump truck 1 and includes a camera that captures the images of the surroundings of the dump truck 1. The surroundings monitoring system 7 includes a plurality of image capturing devices 10 so that different areas of the surroundings of the dump truck 1 are imaged. In the present embodiment, six image capturing devices 10 are disposed in the dump truck 1. In the following description, the six image capturing devices 10 will, be appropriately referred to as image capturing devices 11, 12, 13, 14, 15, and 16, respectively.

In the following description, when the individual image capturing devices 11 to 16 are not distinguished, the image capturing devices 11 to 16 will be appropriately collectively referred to as the image capturing device 10.

Since a plurality of image capturing devices 10 is disposed, the surroundings monitoring system 7 can acquire the images of different areas of the surroundings of the dump truck 1.

The detection device 20 is disposed in the dump truck 1 and includes a radar device that can detect an object around the dump truck 1 in a non-contacting manner. The surroundings monitoring system 7 includes a plurality of detection devices (radar devices) 20 so that different areas of the surroundings of the dump truck 1 are detected. In the present embodiment, eight radar devices 20 are disposed in the dump truck 1. In the following description, the eight radar devices 20 will be appropriately referred to as radar devices 21, 22, 23, 24, 25, 26, 27, and 28, respectively.

In the following description, when the individual radar devices 21 to 28 are not distinguished, the radar devices 21 to 28 will be appropriately collectively referred to as the radar device 20.

Since a plurality of radar devices 20 is disposed, the surroundings monitoring system 7 can detect objects present in different areas of the surroundings of the dump truck 1.

<Arrangement Example of Image Capturing Device and Radar Device>

Figure 4:
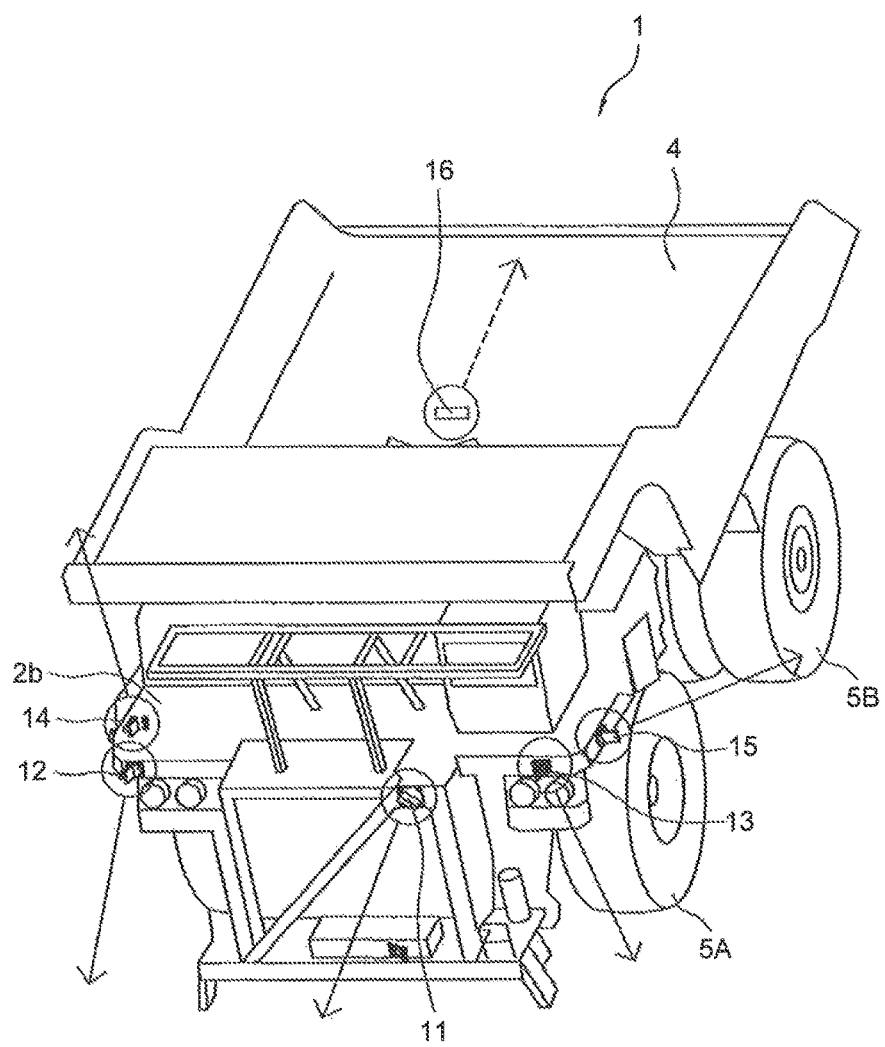
FIG. 4 is a diagram illustrating arrangement positions of image capturing devices provided in a dump truck.

Next, an arrangement example of the image capturing devices 10 and the radar devices 20 according to the present embodiment will be described. FIG. 4 is a diagram illustrating an example of an arrangement position of the image capturing devices 10 (11 to 16) according to the present embodiment.

As illustrated in FIG. 4, each of the image capturing devices 11 to 16 is attached to a peripheral portion of the dump truck 1 in order to acquire the images in an angular range of 360° of the dump truck 1. Each of the image capturing devices 11 to 16 has a visual field range of 120° in a left-to-right (horizontal) direction and 96° in a height (vertical) direction.

The image capturing device 11 is a camera that images the front side of the vehicle body 2, and as illustrated in FIG. 4, is disposed below a landing portion of an uppermost stage of the inclined ladder 2d. The image capturing device 11 is fixed to face the front side of the vehicle body 2 by a bracket that is attached to the upper deck 2b. The imaging range of the image capturing device 11 spreads toward the front side of the vehicle body 2.

The image capturing device 12 is a camera that images an obliquely right front side of the vehicle body 2, and as illustrated in FIG. 4, is disposed near the right end of the front surface of the upper deck 2b. The image capturing device 12 is fixed to an obliquely right front side of the vehicle body 2 by a bracket that is attached to the upper deck 2b. The imaging range of the image capturing device 12 spreads toward an obliquely right front side of the vehicle body 2.

The image capturing device 13 is a camera that images an obliquely left front side of the vehicle body 2, and as illustrated in FIG. 4, is fixed at a position bilaterally symmetric to the image capturing device 12. That is, the image capturing device 13 is fixed to face an obliquely left front side of the vehicle body 2 by a bracket that is attached to the upper deck 2b. The imaging range of the image capturing device 13 spreads toward an obliquely left front side of the vehicle body 2.

The image capturing device 14 is a camera that images an obliquely right rear side of the vehicle body 2, and as illustrated in FIG. 4, is disposed near the front end of the right surface of the upper deck 2b. The image capturing device 14 is fixed toward an obliquely right rear side of the vehicle body 2 by a bracket that is attached to the upper deck 2b. The imaging range of the image capturing device 14 spreads toward an obliquely right rear side of the vehicle body 2.

The image capturing device 15 is a camera that images an obliquely left rear side of the vehicle body 2, and as illustrated in FIG. 4, is disposed at a position bilaterally symmetric to the image capturing device 14. That is, the image capturing device 15 is disposed to face an obliquely left rear side of the vehicle body 2 by a bracket that is attached to the upper deck 2b. The imaging range of the image capturing device 15 spreads toward an obliquely left rear side of the vehicle body.

The image capturing device 16 is a camera that images the rear side of the vehicle body 2, and as illustrated in FIG. 4, is disposed above a rear axle that connects two rear wheels 5B at the rear end of the frame 2f and near a rotary shaft of the vessel 4 and is fixed toward the rear side of the vehicle body 2 by a bracket that is attached to a cross member. The imaging range of the image capturing device 16 spreads toward the rear side of the vehicle body 2.

By using these image capturing devices 11 to 16, it is possible to acquire the images of the entire periphery of the dump truck 1. The image capturing devices 11 to 16 respectively output the captured images to the controller 100.

Moreover, the image capturing devices 11 to 16 are provided in the upper deck 2b and the cross member which are located at a high position of the frame 2f. Due to this, the image capturing devices 11 to 16 can obtain captured images which are seen from the upper position toward the ground and can image obstacles present on the ground in a broad range. Moreover, even when the viewpoint is changed when bird's-eye images are formed, since images captured from the upper position are used, it is possible to suppress the degree of deformation of a three-dimensional object.

Figure 5:
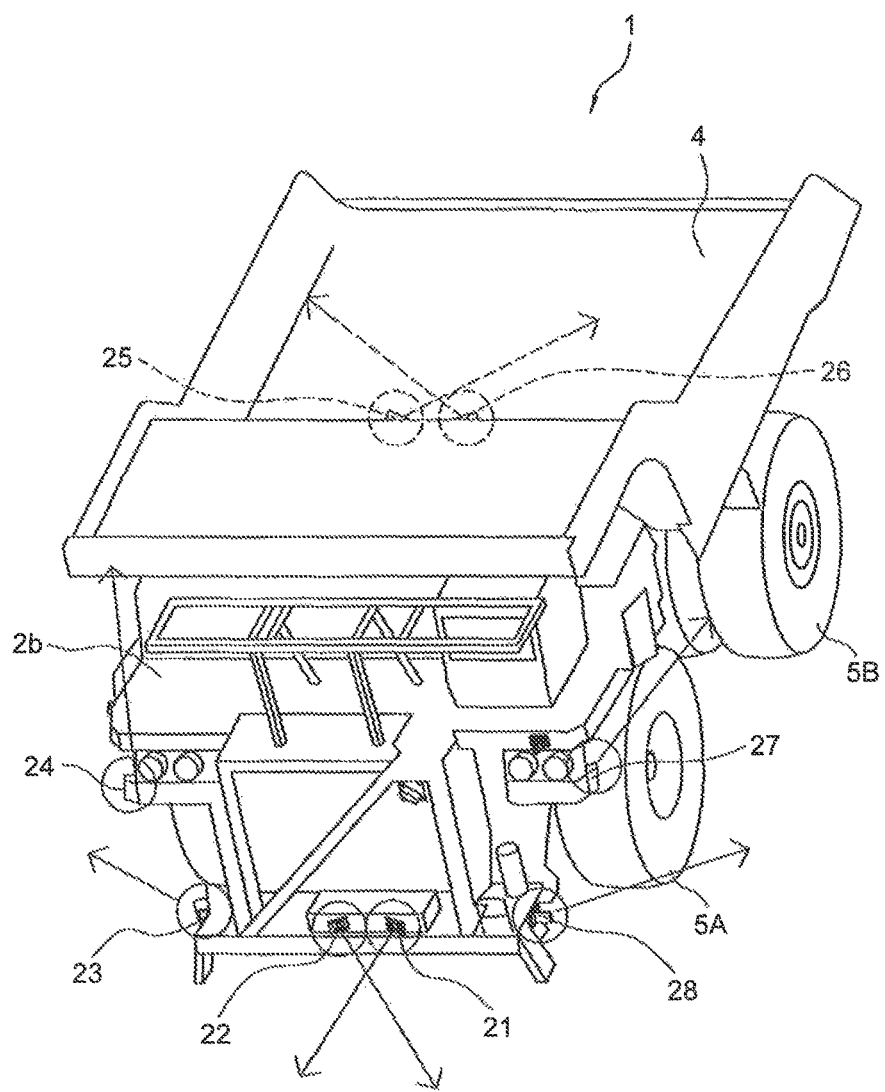
FIG. 5 is a diagram illustrating arrangement positions of radar devices provided in the dump truck.

FIG. 5 is a diagram illustrating an example of an arrangement position of the radar devices 20 (21 to 28) according to the present embodiment.

The radar devices 21 to 28 are ultra-wide band (UWE) radars which have a detection angle of 80° (±40°) in an azimuthal (horizontal) direction and 16° (±8°) in an up-to-down (vertical) direction and a maximum detection distance of 15 m or more. With the disposed radar devices 21 to 28, a relative position of an object (obstacle) present in the entire periphery of the dump truck 1 is detected. The radar devices 21 to 28 are disposed in the peripheral portion of the dump truck 1. Although the detection angle in the azimuthal (horizontal) direction of the radar devices 21 to 28 is set to 80° (±40°), the radar devices may have a larger detection angle.

Figure 6:
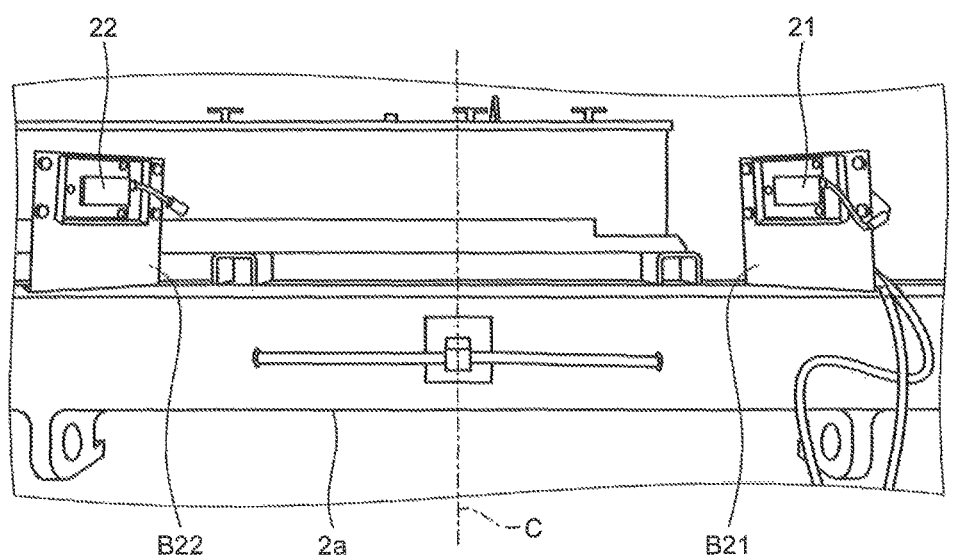
FIG. 6 is a diagram illustrating a specific arrangement of radar devices that detect the front side of a vehicle body.

The radar devices 21 and 22 will be described with reference to FIG. 5, and FIG. 6 illustrating the front side view of the dump truck 1. The radar devices 21 and 22 are provided below the inclined ladder 2d and on the lower deck 2a which is positioned approximately 1 m from the ground positioned below the upper deck 2b in which the image capturing device 11 that mainly images the front side of the vehicle body 2 is provided. The radar devices 21 and 22 are attached to the vehicle central surface C in a bilaterally symmetric manner with the brackets B21 and B22 interposed, respectively. The radar device 22 is disposed to face an obliquely left front side and the radar device 21 is disposed to face an obliquely right front side. Specifically, the radiation central axis in the horizontal direction of the radar device 22 is inclined at 45° toward the left side of the vehicle body 2 in relation to the axis in the advancing direction of the vehicle central surface C. The radiation central axis in the horizontal direction of the radar device 21 is inclined at 45° toward the right side of the vehicle body 2 in relation to the axis in the advancing direction of the vehicle central surface C. The respective radiation central axes cross each other. Moreover, the radiation central axes in the vertical direction of the radar devices 21 and 22 have an inclination angle of approximately 5°. In this way, it is possible to detect all objects in a front-side area from the front end of the vehicle body 2.

Figure 7:
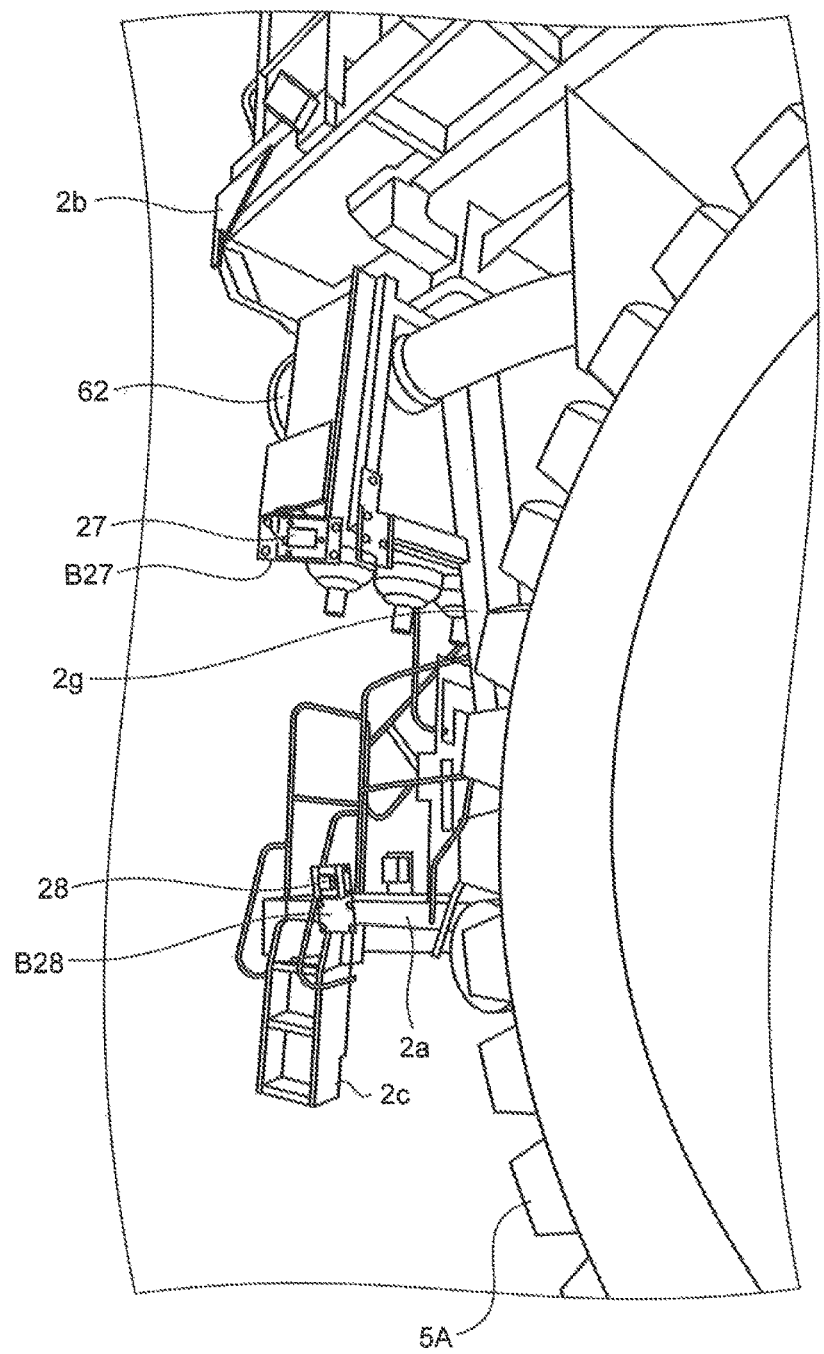
FIG. 7 is a diagram illustrating a specific arrangement of radar devices that detect the front left side of the vehicle body.
Figure 8:
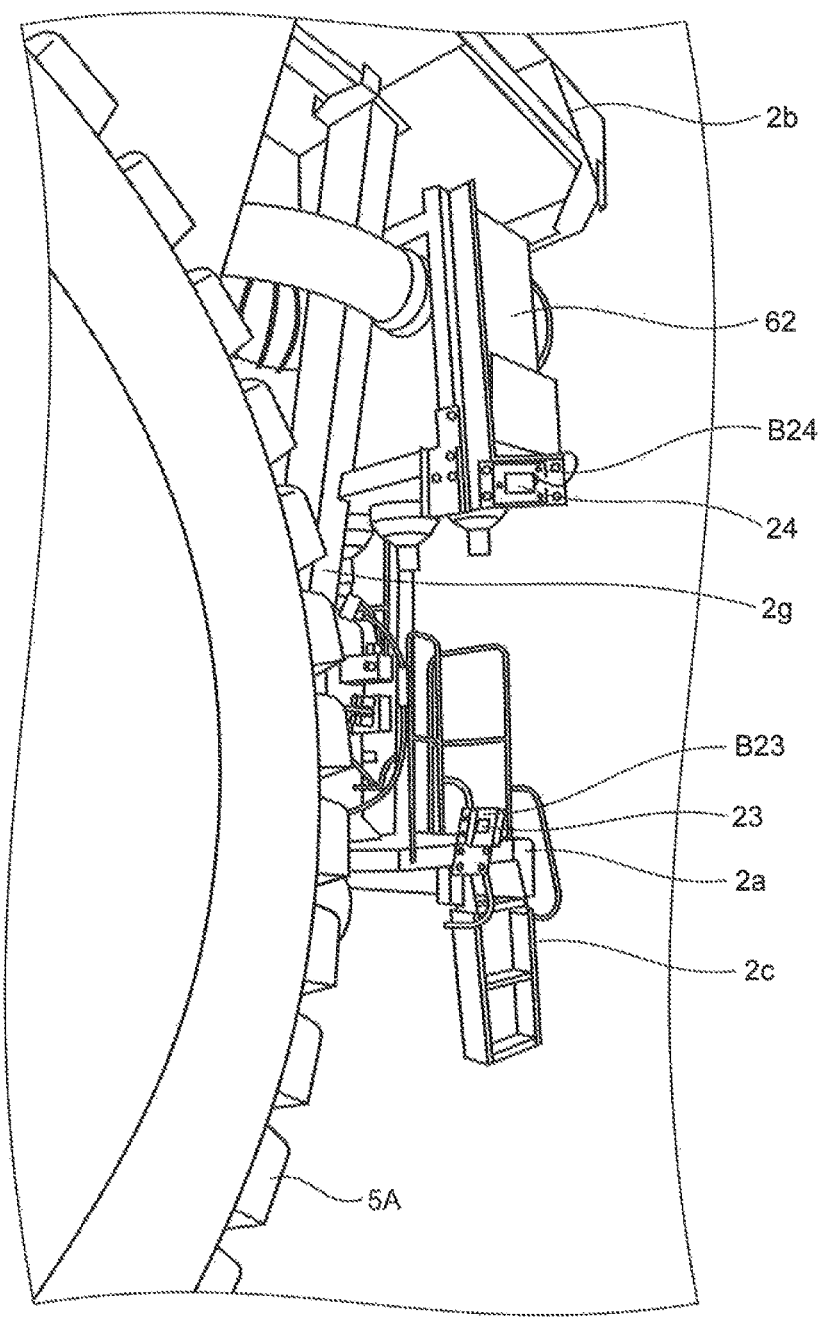
FIG. 8 is a diagram illustrating a specific arrangement of radar devices that detect the front right side of the vehicle body.

The radar device 28 and the radar device 23 positioned at the symmetric positions about the vehicle central surface C will be described with reference to FIG. 5, FIG. 7 illustrating the left side view of the dump truck 1, and FIG. 8 illustrating the right side view of the dump truck 1. The radar device 28 is provided near the upper end of the movable ladder 2c and the left end of the lower deck 2a that is positioned below the upper deck 2b in which the image capturing devices 13 and 15 that mainly image the left side of the vehicle body 1 is provided. The radar device 28 is attached to the lower deck 2b with a bracket B28 interposed and is disposed to face the left outer side of the vehicle body 2.

The radar device 23 is positioned at a bilaterally symmetric position about the vehicle central surface C in relation to the radar device 28 in a left side view of the dump truck 1. The radar device 23 is provided in the movable ladder 2c provided on the right side of the vehicle body 2 and is provided at the right end of the 2n lower deck 2a that is positioned below the upper deck 2b in which the image capturing devices 12 and 14 that mainly image the right side of the vehicle body 2 are provided. The radar device 23 is attached to the lower deck 2b with the bracket B23 interposed, which is provided bilaterally symmetrically about the vehicle central surface C in relation to the bracket B28, and is disposed to face the right outer side of the vehicle body 2.

The radiation central axis in the horizontal direction of the radar device 23 is inclined at 70° toward the right side of the vehicle body 2 in relation to the axis in the retracting direction of the vehicle central surface C. The radiation central axis in the horizontal direction of the radar device 28 is inclined at 70° toward the left side of the vehicle body 2 in relation to the axis in the retracting direction of the vehicle central surface C. Moreover, the respective radiation central axes in the vertical direction of the radar devices 23 and 28 have an inclination angle of approximately 5°.

Due to the radar devices 23 and 28, it is possible to detect an object on the lateral side of the dump truck 1 (in particular, the front side of the front and rear wheels 5A and 5B). Moreover, the radar devices 23 and 28 are positioned below the vessel 4 and the upper deck 2b and are not influenced by stones or the like flying from the vessel 4 during loading.

The radar device 27 and the radar device 24 positioned at symmetrical positions about the vehicle central surface C will be describe with reference to FIG. 5, FIG. 7 illustrating the left side view of the dump truck 1, and FIG. 8 illustrating the right side view of the dump truck 1. The radar device 27 is disposed at a side end of an air cleaner 62 provided at a position protruding laterally from a front fender 2g on the vehicle left side extending toward the lower deck 2a that is positioned below the upper deck 2b in which the image capturing devices 13 and 15 that mainly image the left side of the vehicle body 2 are provided. The radar device 27 is attached to the front fender 2g with the bracket 327 interposed so as to face the rear side. The height of the radar device 27 is approximately 2.5 m from the ground.

The radar device 24 is positioned at a bilaterally symmetric position about the vehicle central surface C in relation to the radar device 27 in the left side view of the dump truck 1. The radar device 24 is disposed at the side end of the air cleaner 62 provided at a position protruding toward the right side from the front fender on the vehicle right side extending toward the lower deck 2a that is positioned below the upper deck 2b in which the image capturing devices 12 and 14 that mainly image the right side of the vehicle body 2 are provided. The radar device 24 is attached to the front fender 2g with the bracket B24 interposed so as to face the rear side.

The radiation central axis in the horizontal direction of the radar device 24 is inclined at 30° toward the right side of the vehicle body 2 in relation to the axis in the retracting direction of the vehicle central surface C. The radiation central axis in the horizontal direction of the radar device 27 is inclined at 30° toward the left side of the vehicle body 2 in relation to the axis in the retracting direction of the vehicle central surface C. Moreover, the respective radiation central axes in the vertical direction of the radar devices 24 and 27 have an inclination angle of approximately 15°.

Due to the radar devices 24 and 27, it is possible to detect an obstacle on the rear side of the central axial line of the front and rear wheels 5A and 6B on the lateral sides of the dump truck 1 (in particular, an obstacle in a lateral rear side area corresponding to the entire lateral sides of the vessel. Moreover, the radar devices 24 and 27 are positioned below the vessel 4 and the upper deck 2b and are not influenced by stones or the like flying from the vessel 4 during loading.

Figure 9:
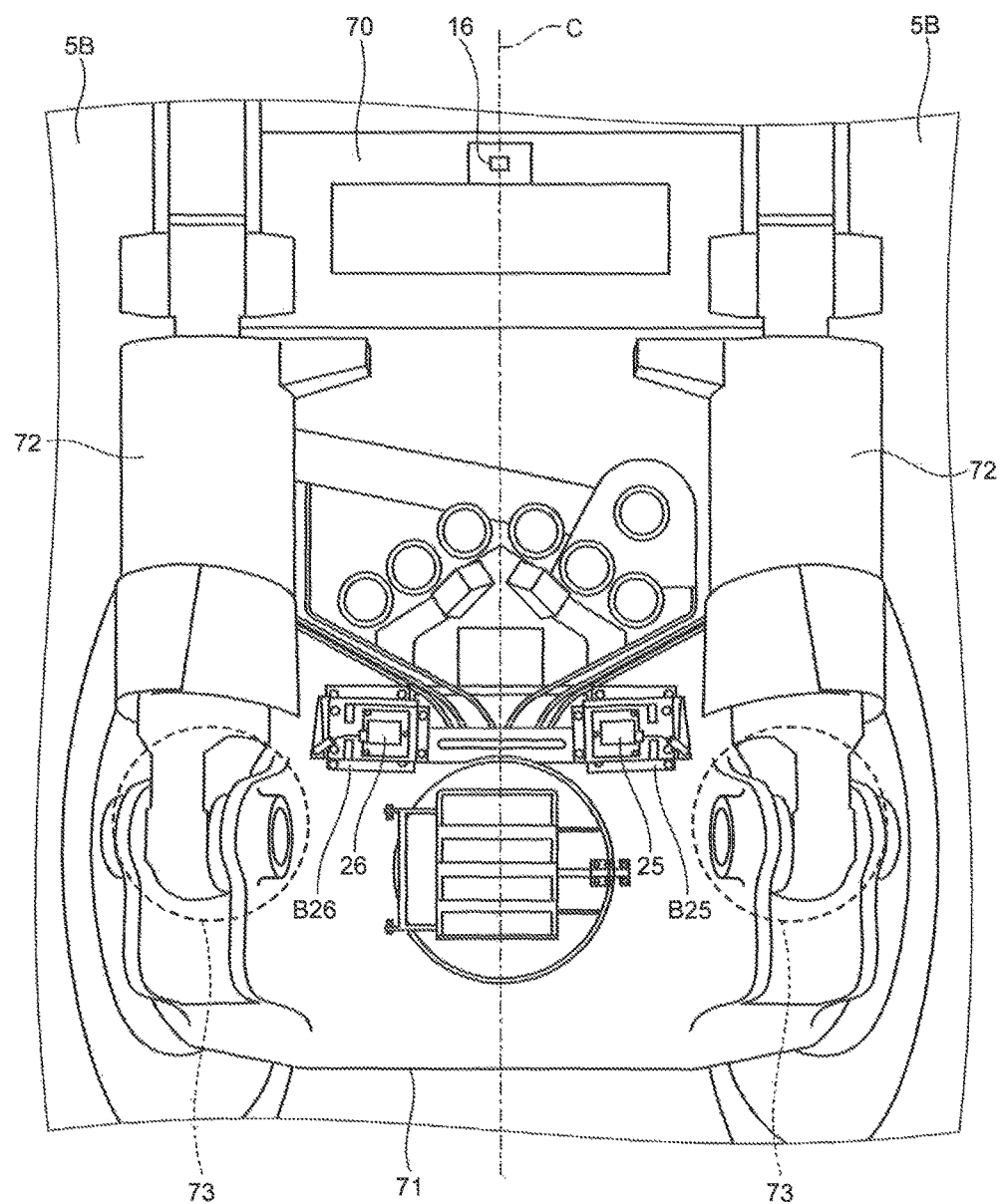
FIG. 9 is a diagram illustrating a specific arrangement of radar devices that detect the rear side of the vehicle body.

The radar devices 25 and 26 will be described with reference to FIG. 5 and FIG. 9 illustrating the rear view of the dump truck 1. The radar devices 25 and 26 are at a height of approximately 2 m from the ground and are disposed on a case rear side of a rear axle 71 of the driving shaft of the rear wheels 5B positioned blow a cross member 70 of the vessel 4, in which the image capturing device 16 is provided. The radar devices 25 and 26 are attached to the vehicle central surface C with the brackets B25 and B26 interposed, respectively, in a bilaterally symmetric manner. Moreover, the radar devices 25 and 26 are provided between joint portions 73 of a rear suspension cylinder 72. The radar device 26 is disposed to face an obliquely right rear side, and the radar device 25 is disposed to face an obliquely left rear side.

The radiation central axis in the horizontal direction of the radar device 26 is inclined at 45° toward the right side of the vehicle body 2 in relation to the axis in the retracting direction of the vehicle central surface C. The radiation central axis in the horizontal direction of the radar device 25 is inclined at 45° toward the left side of the vehicle in relation to the axis in the retracting direction of the vehicle central surface C. The respective radiation central axes cross each other on the vehicle central surface C below the vessel 4. Moreover, the radiation central axes in the vertical direction of the radar devices 25 and 26 have an inclination angle of 0° to 10° in the inclination angle direction (in the present embodiment, approximately 5°).

Figure 10:
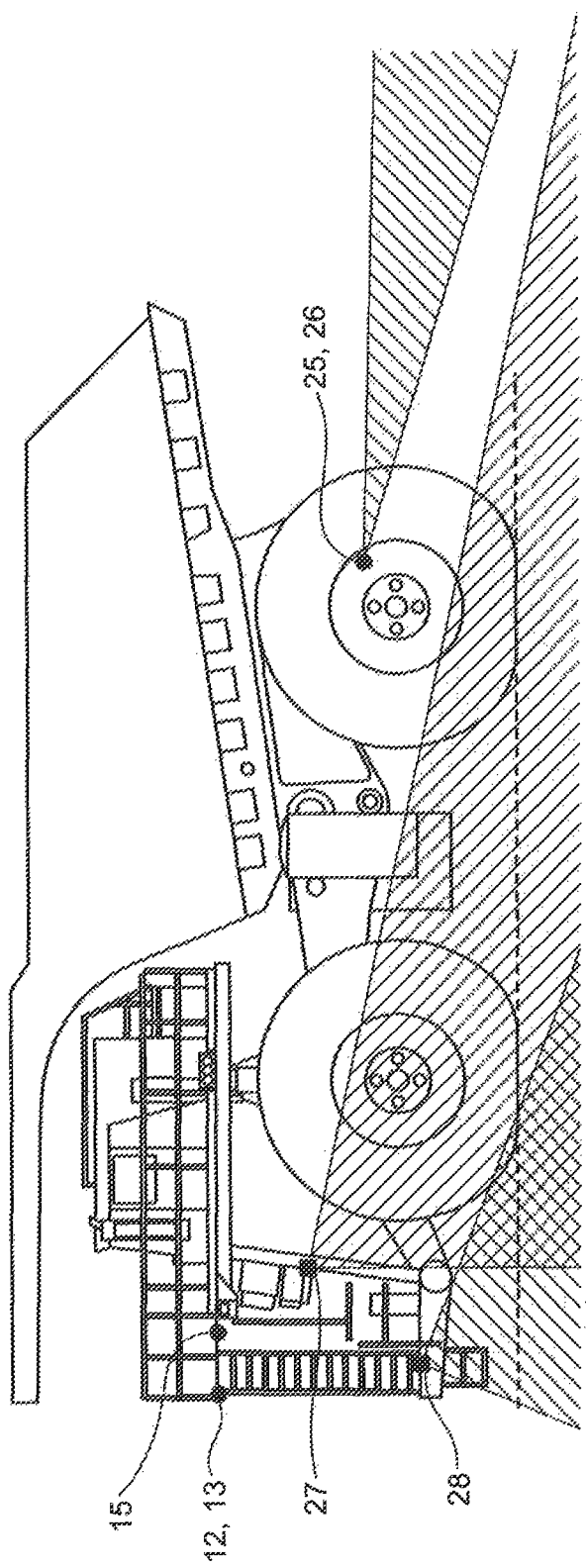
FIG. 10 is a diagram illustrating a left side surface of the vehicle body and a radiation state of the radar device.
Figure 11:
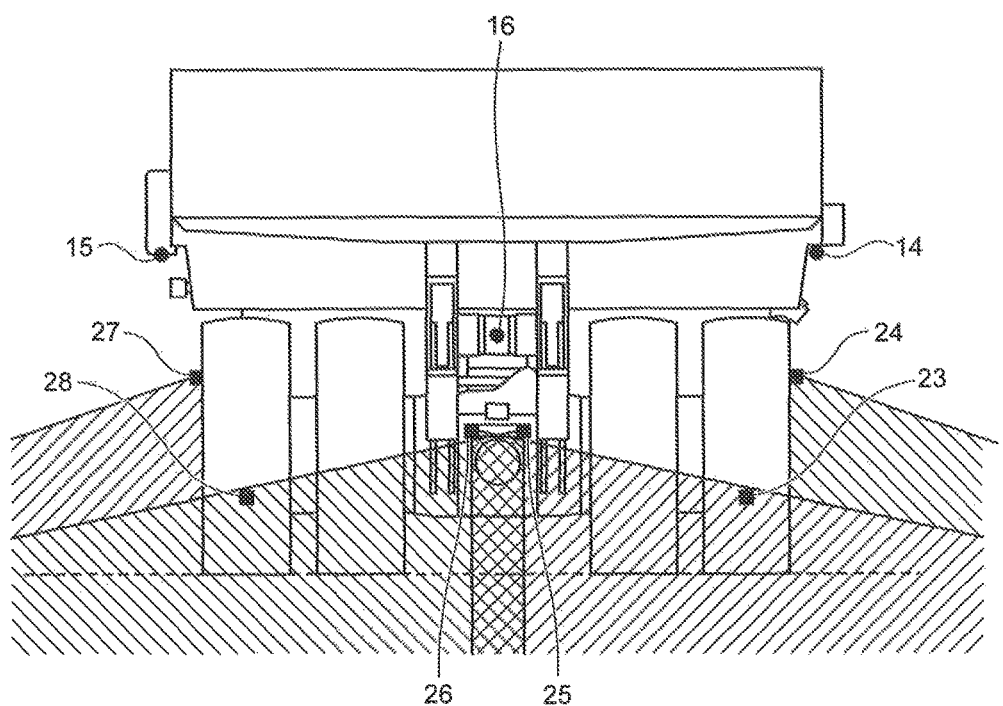
FIG. 11 is a diagram illustrating the rear side of the vehicle body and a radiation state of the radar device.

Since the respective radar devices 25 and 26 are attached bilaterally symmetrically to the vehicle central surface C and provided so that the respective radiation central axes cross each other, it is possible to detect all objects in the rear side area from the rear end of the vehicle body 2. In particular, the radar devices 25 and 26 are disposed at a small inclination angle in the case of the rear axle 71 positioned at a lower position than the cross member 70. As illustrated in FIGS. 10 and 11, due to the radar devices 25 and 26 provided at a small inclination angle at a lower position than the vehicle body 2, it is possible to detect an object in a far side of the vehicle body 2 and a hidden object in the rear side of the vessel 4 at the same time. Although the radiation central axis in the horizontal direction of the radar device 25 and the radiation central axis in the horizontal direction of the radar device 26 are at 45° in relation to the vehicle central surface C, the radiation central axes may be at an angle of 45° or smaller, and for example, may be at 30°. This value may be determined depending on the degree in which the radar devices 25 and 26 protrude toward the rear side from the rear end of the wheels 5B.

The radar devices 21 to 28 that detect obstacles in respective directions of the vehicle body 2 are attached to members disposed at lower positions than the image capturing devices 11 to 16 that image the respective directions of the vehicle body 2 in order to generate bird's-eye images. Since the radar devices are provided at the lower positions than the image capturing devices even when the radar devices used have a small angle in the vertical direction, it is possible to display obstacle information detected by the radar devices in the bird's-eye images captured and generated by the image capturing devices.

<Image Capturing Device>

Figure 12:
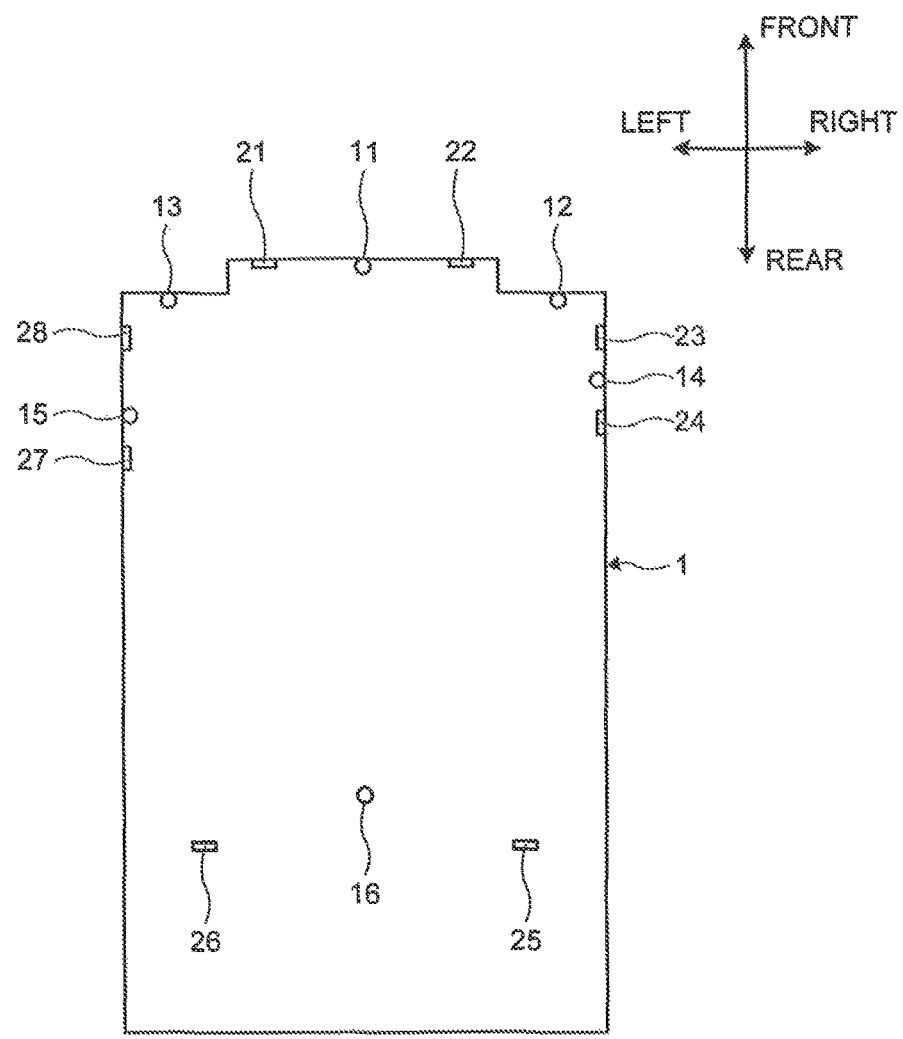
FIG. 12 is a plan view schematically illustrating an example of an image capturing device and a radar device according to the present embodiment.
Figure 13:
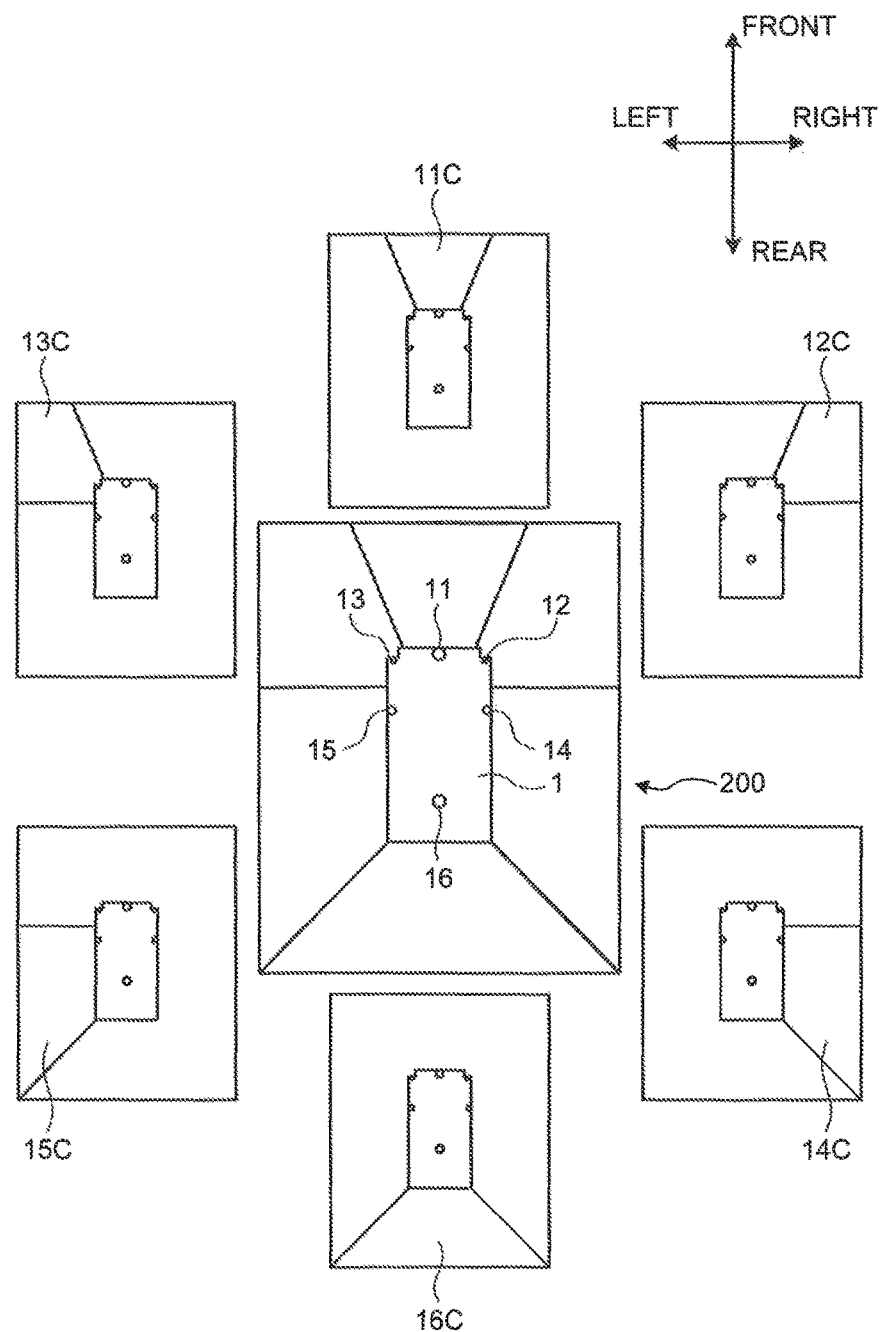
FIG. 13 is a schematic diagram illustrating an example of an imaging area and a bird's-eye image of the image capturing device according to the present embodiment.

Next, the image capturing device 10 according to the present embodiment will be described with reference to FIGS. 12 and 13. FIG. 12 is a plan view schematically illustrating an example of the image capturing device 10 and the radar device 20 according to the present embodiment. FIG. 13 is a schematic diagram illustrating an example of imaging areas 10C (11C to 16C) captured by the plurality of image capturing devices 10 (11 to 16) and a bird's-eye image 200 generated based on image information captured by the plurality of image capturing devices 10.

The image capturing devices 10 (11 to 16) are disposed in the dump truck 1 so as to capture the images of the surroundings of the dump truck 1. The image capturing devices 10 capture the images of the surroundings of the dump truck 1 and output image information to the controller 100. The image capturing devices 10 are wide dynamic range (WDR) cameras, for example. The wide dynamic range camera is a camera that has a function of correcting a dark portion to a bright portion while maintaining to a level that a bright portion is visible and adjusting the entire portion so as to be visible. The image capturing devices 10 are disposed in the peripheral portion of the dump truck 1 in order to capture the images in an angular range of 360° of the dump truck 1.

The image capturing device 11 is disposed in the front portion of the dump truck 1. The image capturing device 11 images an imaging area 11C which is a partial area of the surroundings of the dump truck 1 and outputs image information of the imaging area 11C to the controller 100. The imaging area 11C is an area that spreads toward the front side of the vehicle body 2 of the dump truck 1.

The image capturing device 12 is disposed at the right end of the front portion of the dump truck 1 in relation to the left-to-right direction. The image capturing device 12 images an imaging area 12C which is a partial area of the surroundings of the dump truck 1 and outputs image information of the imaging area 12C to the controller 100. The imaging area 12C is an area that spreads toward an obliquely right front side of the vehicle body 2 of the dump truck 1.

The image capturing device 13 is disposed at the left end of the front portion of the dump truck 1 in relation to the left-to-right direction. The image capturing device 13 images an imaging area 13C which is a partial area of the surroundings of the dump truck 1 and outputs image information of the imaging area 13C to the controller 100. The imaging area 13C is an area that spreads toward an obliquely left front side of the vehicle body 2 of the dump truck 1.

The image capturing device 14 is disposed in a right side portion of the dump truck 1 in relation to the left-to-right direction. The image capturing device 14 images an imaging area 14C which is a partial area of the surroundings of the dump truck 1 and outputs image information of the imaging area 14C to the controller 100. The imaging area 14C is an area that spreads toward an obliquely right rear side of the vehicle body 2 of the dump truck 1.

The image capturing device 15 is disposed in a left side portion of the dump truck 1 in relation to the left-to-right direction. The image capturing device 15 images an imaging area 15C which is a partial area of the surroundings of the dump truck 1 and outputs image information of the imaging area 15C to the controller 100. The imaging area 15C is an area that spreads toward an obliquely left rear side of the vehicle body 2 of the dump truck 1.

The image capturing device 16 is disposed in a rear portion of the dump truck 1. The image capturing device 16 images an imaging area 16C which is a partial area of the surroundings of the dump truck 1 and outputs image information of the imaging area 16C to the controller 100. The imaging area 16C is an area that spreads toward the rear side of the vehicle body 2 of the dump truck 1.

The plurality of imaging areas 11C to 16C is different areas of the surroundings of the dump truck 1. By using the plurality of image capturing devices 10 (11 to 16), the surroundings monitoring system 7 can capture the images in an angular range of 360° of the dump truck 1 and obtain the image information.

In the following description, when the individual imaging areas 11C to 16C are not distinguished, the imaging areas 11C to 16C will be appropriately collectively referred to as the imaging area 10C.

In the surroundings monitoring system 7, wide dynamic range cameras are used as the image capturing devices 10. Due to this, the image capturing devices 10 can correct a dark portion such as a shadow portion of the dump truck 1 to a bright portion while maintaining to a level that a bright portion is visible. Thus, black defects and halation rarely occur in the images captured by the image capturing devices 10, and images that are generally easy to understand are obtained. As a result, the surroundings monitoring system 7 including the image capturing devices 10 can display the bird's-eye image 200 in which an object such as a vehicle present in a shadow area of the dump truck 1 is easy to be recognized on the display device 50. In this manner, when monitoring the surroundings of the dump truck 1 using the images captured by the image capturing devices 10, the surroundings monitoring system 7 can display an object around the dump truck 1 on the bird's-eye image 200 even in an environment where the contrast difference between bright and dark portions is large. As a result, the operator of the dump truck 1 can reliably recognize an object around the dump truck 1 (in particular, an object present in a shadow area) regardless of the environment.

In this manner, since the surroundings monitoring system 7 can generate the bird's-eye image 200 in which an object around the dump truck 1 is reliably displayed even in an environment where the contrast difference between bright and dark portions is large, an object present in a blind spot of the operator can be reliably recognized from the bird's-eye image 200. Thus, the surroundings monitoring system 7 is ideal when monitoring the surroundings of such a very large dump truck 1 used in a mine as described above. That is, the dump truck 1 may form a very large shadow area and may move while creating a shadow area by itself, and the shadow area changes greatly with elevation and lowering of the vessel 4 and a blind spot area is large. In such a dump truck 1, the surroundings monitoring system 7 can generate the bird's-eye image 200 in which an object around the dump truck 1 is reliably displayed and can provide accurate information on the surroundings of the dump truck 1 to the operator of the dump truck 1. Moreover, the surroundings monitoring system 7 can provide accurate information on the surroundings of the dump truck 1 to the operator of the dump truck 1 which operates in such a place that is directly on the equator and that a luminance difference between the shade and the light is extremely large.

<Radar Device>

Figure 14:
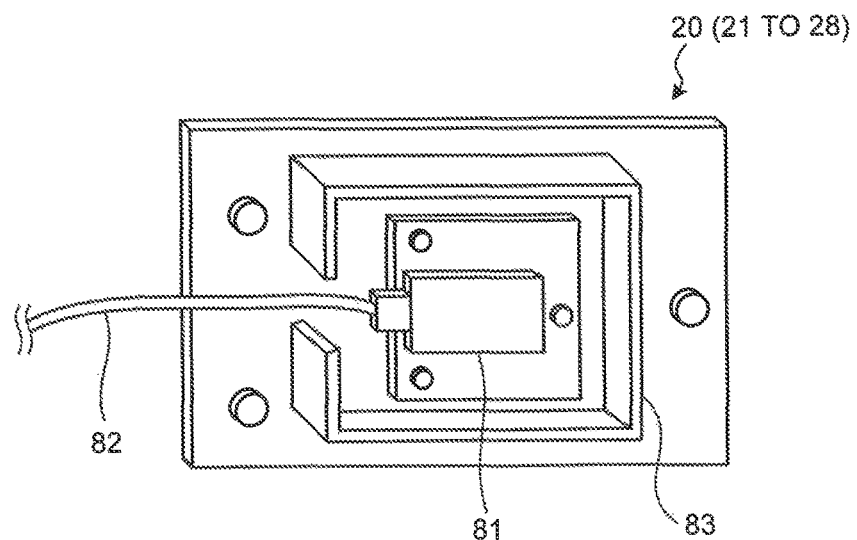
FIG. 14 is a diagram illustrating an example of the radar device according to the present embodiment.
Figure 15:
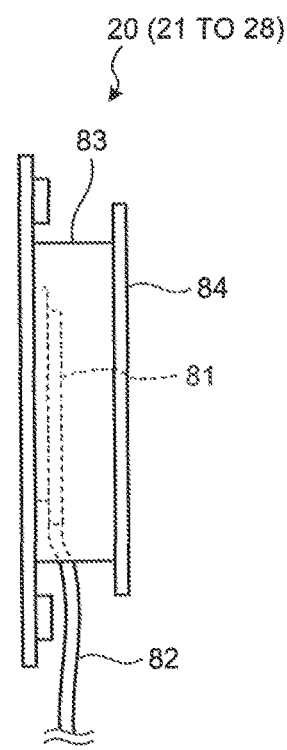
FIG. 15 is a diagram illustrating an example of the radar device according to the present embodiment.
Figure 16:
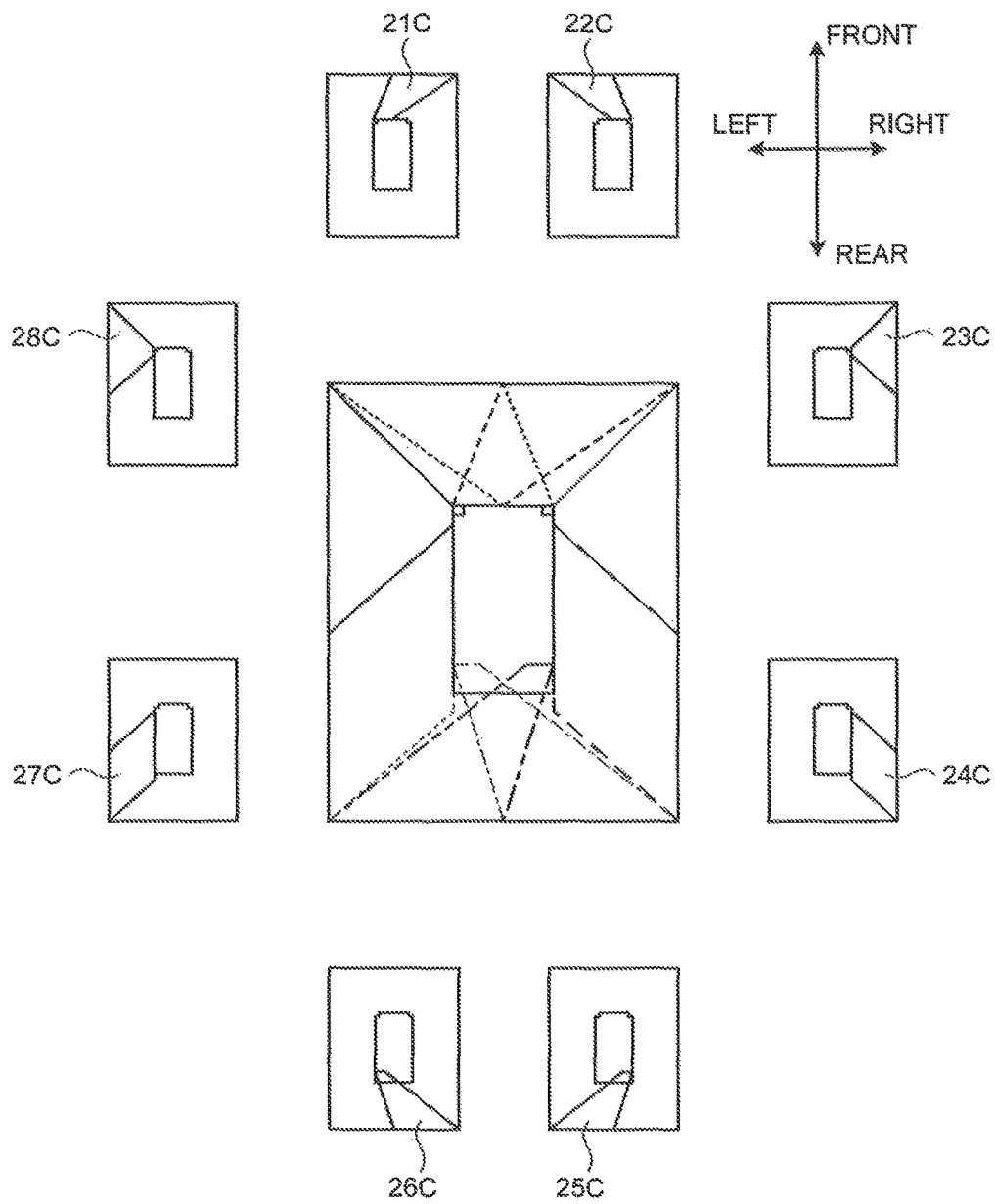
FIG. 16 is a schematic diagram illustrating an example of a detection area of the radar device according to the present embodiment.

Next, the radar device 20 according to the present embodiment will be described with reference to FIGS. 12, 14, 15, and 16. FIG. 12 is a plan view schematically illustrating an example of the image capturing device 10 and the radar device 20 according to the present embodiment. FIG. 14 is a diagram illustrating an example of the radar device 20. FIG. 15 is a diagram illustrating an example of the radar device 20. FIG. 16 is a schematic diagram illustrating an example of detection areas 20C (21C to 28C) detected by the plurality of radar devices 20 (21 to 28).

The radar devices 20 (21 to 28) are disposed in the dump truck 1 and can detect an object around the dump truck 1. The radar devices 20 detect a relative position of an object present around the dump truck 1 in relation to the dump truck 1. The radar devices 20 detect an object around the dump truck 1 in a non-contacting manner and output a detection result to the controller 100. The radar devices 20 are ultra-wide band (UWB) radars which have, for example, a detection angle of 80° (±40°) in an azimuthal (horizontal) direction and 16° (±8°) in an up-to-down (vertical) direction and a maximum detection distance of 15 m or more. The respective radar devices 20 are disposed in the peripheral portion of the dump truck 1 in order to detect an object in an angular range of 360° of the dump truck 1.

The radar device 20 includes an emitting portion capable of emitting radio waves and a receiving portion capable of receiving radio waves. At least a portion of the radio waves emitted from the emitting portion of the radar device 20 and radiated to an object is reflected from the object. The receiving portion of the radar device 20 receives a radio wave from the object, which is reflected from a reflecting portion. The radar device 20 receives the radio wave from the object to detect a relative position of the object in relation to the radar device 20. The radar device 20 is fixed to the dump truck 1 by a bracket. When the relative position of the object in relation to the radar device 20 is detected, the relative position of the object in relation to the dump truck 1 is detected.

As illustrated in FIG. 14, the radar device 20 includes a radar body 81 having an emitting portion and a receiving portion and a protective member 83 which is a c hood that surrounds the radar body 81. A notch is formed in a portion of the protective member 83 from which a cable 82 is taken out. With the protective member 83, it is possible to prevent mud from adhering to the emitting portion of the radar body 81 and to maintain the detection function of the radar device 20. Moreover, with the protective member 83, it is possible to prevent damage of the radars due to splash of stones or the like.

As illustrated in FIG. 15, the radar device 20 includes a protective member 84 that covers an opening (that is, an emission-side opening) of a space surrounded by a protective member 83. Although the protective member 84 protects a front surface and naturally has strength, the protective member 84 needs to be a member that transmits radar signals. Moreover, the protective member 84 is preferably a transparent member. This is because, if the protective member 84 is transparent, it is possible to recognize dew condensation or the like on the surface of a radar body 81 with naked eyes. The protective member 84 is formed from polycarbonate, for example.

The radar device 21 is disposed in a front portion of the dump truck 1. The radar device 21 is disposed closer to the left side than the central portion of the dump truck 1 in relation to the left-to-right direction. The radar device 21 can detect an object in the detection area 21C which is a partial area of the surroundings of the dump truck 1. The radar device 21 outputs a detection result to the controller 100. The detection area 21C is an area that spreads toward an obliquely right front side from the front portion of the vehicle body 2 of the dump truck 1.

The radar device 22 is disposed in the front portion of the dump truck 1. The radar device 22 is disposed closer to the right side than the central portion of the dump truck 1 in relation to the left-to-right direction. The radar device 22 can detect an object in the detection area 22C which is a partial area of the surroundings of the dump truck 1. The radar device 22 outputs a detection result to the controller 100. The detection area 22C is an area that spreads toward an obliquely left front side from the front portion of the vehicle body 2 of the dump truck 1.

The radar device 23 is disposed in a right side portion of the dump truck 1. The radar device 23 can detect an object in the detection area 23C which is a partial area of the surroundings of the dump truck 1. The radar device 23 outputs a detection result to the controller 100. The detection area 23C is an area that spreads toward the right side from the right side portion of the vehicle body 2 of the dump truck 1.

The radar device 24 is disposed in the right side portion of the dump truck 1. The radar device 24 is disposed closer to the rear side than the radar device 23. The radar device 24 can detect an object in the detection area 24C which is a partial area of the surroundings of the dump truck 1. The radar device 24 outputs a detection result to the controller 100. The detection area 24C is an area that spreads toward the right side from the right side portion of the vehicle body 2 of the dump truck 1. The detection area 24C is positioned closer to the rear side than the detection area 23C.

The radar device 25 is disposed in a rear portion of the dump truck 1. The radar device 25 is disposed closer to the right side than the central portion of the dump truck 1 in relation to the left-to-right direction. The radar device 25 can detect an object in the detection area 25C which is a partial area of the surroundings of the dump truck 1. The radar device 25 outputs a detection result to the controller 100. The detection area 25C is an area that spreads toward an obliquely left rear side from the rear portion of the vehicle body 2 of the dump truck 1.

The radar device 26 is disposed in the rear portion of the dump truck 1. The radar device 26 is disposed closer to the left side than the central portion of the dump truck 1 in relation to the left-to-right direction. The radar device 26 can detect an object in the detection area 26C which is a partial area of the surroundings of the dump truck 1. The radar device 26 outputs a detection result to the controller 100. The detection area 26C is an area that spreads toward an obliquely right rear side from the rear portion of the vehicle body 2 of the dump truck 1.

The radar device 27 is disposed in a left side portion of the dump truck 1. The radar device 27 can detect an object in the detection area 27C which is a partial area of the surroundings of the dump truck 1. The radar device 27 outputs a detection result to the controller 100. The detection area 27C is an area that spreads toward the left side from the left side portion of the vehicle body 2 of the dump truck 1.

The radar device 28 is disposed in the left side portion of the dump truck 1. The radar device 28 is disposed closer to the front side than the radar device 27 The radar device 28 can detect an object in the detection area 28C which is a partial area of the surroundings of the dump truck 1. The radar device 28 outputs a detection result to the controller 100. The detection, area 28C is an area that spreads toward the left side from the left side portion of the vehicle body 2 of the dump truck 1. The detection area 28C is positioned closer to the front side than the detection area 27C.

The plurality of detection areas 21C to 28C are different areas of the surroundings of the dump truck 1, By using the plurality of radar devices 20 (21 to 28), the surroundings monitoring system 7 can detect an object in an angular range of 360° of the dump truck 1 and obtain object information thereof.

In the following description, when the individual detection areas 21C to 28C are not distinguished, the detection areas 21C to 28C will appropriately collectively referred to as the detection area 20C.

The radar device 20 is disposed at a lower position than the image capturing device 10. The image capturing device 10 is disposed at a high position in order to generate the bird's-eye image 200.

<Controller>

Next, the controller 100 according to the present embodiment will be described with reference to FIG. 3. The controller 100 includes a central processing unit (CPU) which is an arithmetic device and a memory such as a video random access memory (VRAM). The controller 100 displays the presence of an object around the dump truck 1 on the display device 50 using the image capturing device 10 and the radar device 20. As illustrated in FIG. 3, the controller 100 includes a bird's-eye image combining unit 110 that generates the bird's-eye image 200, an acquisition unit 120 that acquires command signals (input signals and operation signals), a position information generating unit 130 that generates position information of an object, a display control unit 140 that controls the display device 50, a mode control unit 150 that sets the mode of the dump truck 1, a determining unit 210 that determines the quality of the operating state of the radar device 20, a processing unit 220 that processes the detection result of the radar device 20, an abnormality detecting unit 230 that detects an abnormality of the radar device 20, a storage unit 160, and a timer 170.

The bird's-eye image combining unit 110 acquires image information from the image capturing device 10. The bird's-eye image combining unit 110 combines a plurality of items of acquired image information to generate the bird's-eye image 200 of the surroundings of the dump truck 1. The bird's-eye image combining unit 110 converts the coordinates of the plurality of items of image information to generate bird's-eye image information for displaying the bird's-eye image 200.

The position information generating unit 130 acquires position information of an object from the radar device 20. In a normal operation state, the position information generating unit 130 generates object position information to be displayed together with the bird's-eye image 200 from the position information of the object acquired from the radar device 20 and outputs the object position information to the display control unit 140.

The display control unit 140 acquires various items of information from the image capturing device 10, the bird's-eye image combining unit 110, and the position information generating unit 130. The display control unit 140 generates the bird's-eye image 200 including the position information of the object based on the bird's-eye image information from the bird's-eye image combining unit 110 and the object position information from the position information generating unit 130. The display control unit 140 can display the bird's-eye image 200 on the display device 50. The display control unit 140 can display a mark MK indicating the object position information on the display device 50. The display control unit 140 can display the mark MK and the bird's-eye image 200 on the display device 50 so as to overlap on the screen of the display device 50.

Moreover, the display control unit 140 can display the image of the imaging area 100 on the display device 50 based on the image information from the image capturing device 10.

The display control unit 140 can change the display mode of the display device 50 based on the command signal from the input device 80. The display control unit 140 can display the image of the dump truck 1 and both the mark MK and the bird's-eye image 200 of the surroundings of the dump truck 1 simultaneously or can display the bird's-eye image 200 only.

Moreover, the display control unit 140 can change the display mode of the display device 50 based on the command signal from the shift lever position sensor 37S. The display control unit 140 acquires information relates to the travelling state (at least one of a forward state, a backward state, a neutral state, a parking state, and a gear shifting state) of the dump truck 1 based on the command signal from the shift lever position sensor 37S. The display control unit 140 can change the imaging areas 10C (11C to 16C) to be displayed on the display device 50 according to an operation of the shift lever 37. For example, when the shift lever 37 is operated so that the dump truck 1 is in the backward state, the display control unit 140 displays the image of the imaging area 16C on the rear side of the dump truck 1 based on the detection result of the shift lever position sensor 37S. When the shift lever 37 is operated so that the dump truck 1 is in the forward state, the display control unit 140 displays the image of the imagine area 11C on the front side of the dump truck 1 based on the detection result of the shift lever position sensor 37S.

The acquisition unit 120 acquires the command signals (input signals and operation signals) from the input device 80, the command signals (input signals and operation signals) from the shift lever position sensor 37S, and the command signals (input signals and operation signals) from the parking brake operating switch 37P. The acquisition unit 120 outputs control information corresponding to the command signal to the mode control unit 150.

The mode control unit 150 acquires control information from the acquisition unit 120. The mode control unit 150 switches the mode of the dump truck 1 between a normal operation state and an operation checking mode based on the control information from the acquisition unit 120. The operation checking mode is a mode for inspecting the radar device 20. The normal operation state is a state where the dump truck 1 operates (travels) normally and is a state other than the state where the operation checking mode is executed.

The operation checking mode is a mode of checking the quality of the operating state of the radar device 20 when the dump truck 1 is in the barking state before the dump truck 1 starts working (operating). When the dump truck 1 is in a non-parking state, the mode control unit 150 does not perform the operation checking mode. The mode control unit 150 can determine whether the dump truck 1 is in the parking state based on the input signal from the parking brake operating switch 37P.

The mode control unit 150 may determine whether the dump truck 1 is in the parking state based on the input signal from the shift lever position sensor 37S. The mode control unit 150 can determine that the dump truck 1 has changed from the parking state to the non-parking state based on the input signal from the shift lever position sensor 37S. The non-parking state includes at least one of a forward state, a backward state, and a neutral state.

The storage unit 160 stores a computer program for executing control on the dump truck 1 in the normal operation state and the operation checking mode and data or the like required for the control. The controller 100 reads and executes the computer program stored in the storage unit 160 and reads the data required for the control to execute control.

The timer 170 measures the time elapsed from a reference point in time. The measurement result of the timer 170 is output to the mode control unit 150, the storage unit 160, and the like.

In the present embodiment, the storage unit 160 stores the execution period of the operation checking mode and the detection result of the radar device 20 in the operation checking mode by referring to the output from the timer 170.

The determining unit 210 is connected to the radar device 20. The determining unit 210 acquires an object detection result in the detection areas 20C (21C to 28C) of the radar devices 20 (21 to 28). In the operation checking mode, the determining unit 210 determines the quality of the operating state of the radar device 20 based on the detection result of the radar device 20. The determining unit 210 outputs the object position information acquired from the radar device 20 to the processing unit 220.

The processing unit 220 outputs the object position information acquired from the radar device 20 to the position information generating unit 130.

<Display Example of Display Device>

Figure 17:
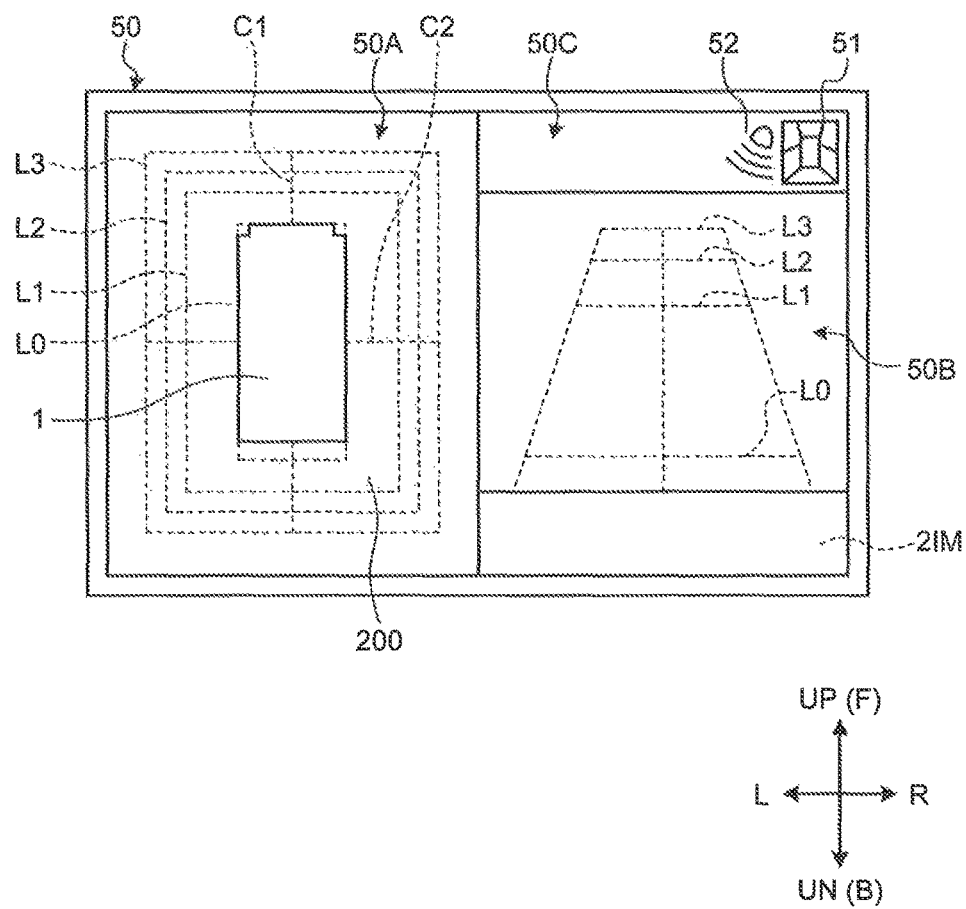
FIG. 17 is a diagram illustrating an example of a display device according to the present embodiment.

Next, an image display example of the display device 50 according to the present embodiment, will be described. FIG. 17 is a diagram illustrating an example of an image that the display control unit 140 of the controller 100 displays on the display device 50. The display device 50 can display color images. In FIG. 17, a reference sign UP indicates an upper side of the display device 50. A reference sign UN indicates a lower side of the display device 50. A reference sign L indicates a left side of the display device 50. A reference sign R indicates a right side of the display device 50. A reference sign F indicates a front side of the dump truck 1. A reference sign B indicates a rear side of the dump truck 1. The dump truck 1 is displayed on the display device 50 so that the upper side of the display device 50 becomes the front side of the dump truck 1 and the lower side of the display device 50 becomes the rear side of the dump truck 1.

FIG. 17 illustrates an image on the display device 50 when the radar device 20 operates normally in the normal operation state. In the present embodiment, in a period where the dump truck 1 is in the non-parking state and travels at a low speed, an image of the normal operation state is displayed on the display device 50. In the present embodiment, in a low-speed travelling period where the travelling speed of the dump truck 1 is equal to or smaller than a predetermined threshold (for example, 15 km per hour), an image of the normal operation state is displayed on the display device 50. In a high-speed travelling period where the travelling speed of the dump truck 1 exceeds the threshold, the display device 50 does not display an image based on the image capturing result of the image capturing device 10. The image displayed based on the image capturing result of the image capturing device 10 includes at least one of the bird's-eye image 200 and the image of the imaging area 10C captured by the image capturing device 10.

In the present embodiment, the input device 80 includes an operation button (forced display button) for causing the display device 50 to display an image based on the image capturing result of the image capturing device 10 in the high-speed travelling period. When the forced display button is operated, the display control unit 140 can display an image on the display device 50 also in the high-speed travelling period.

In the example illustrated in FIG. 17, when the normal operation state starts, the display control unit 140 sets first, second, and third image areas 50A, 50B, and 50C on the screen of the display device 50. In the present embodiment, the first, second, and third image areas 50A, 50B, and 50C are set on the same screen. Different images (independent images) are displayed in the first, second, and third image areas 50A, 50B, and 50C.

The bird's-eye image 200 generated based on the image capturing result of the image capturing device 10 is displayed in the first image area 50A. Moreover, a line L0 indicating the positions of the edges of the vehicle body 2, a line L1 indicating the positions at 3 meters from the edges of the vehicle body 2, a line L2 indicating the positions at 5 meters from the edges of the vehicle body 2, and a line L3 indicating the positions at 7 meters from the edges of the vehicle body 2 are displayed in the first image area 50A. The lines L0, L1, L2, and L3 are displayed in different colors. For example, the line L0 is displayed in a white color, the line L1 in a red color, the L3 in a yellow color, and the line L4 in a black color. The dump truck 1 is displayed in a yellow color, for example. Moreover, a central line C1 extending in the front-to-rear direction along the center of the vehicle body 2 in relation to the left-to-right direction and a central line C2 extending in the left-to-right direction along the center of the vehicle body 2 in relation to the front-to-rear direction are displayed in the first image area 50A. The central lines C1 and C2 are parallel to the horizontal surface.

An image captured by one image capturing device 10 selected from among the plurality of image capturing devices 10 (11 to 16) is displayed in the second image area 50B. In the example illustrated in FIG. 17, the image of the imaging area 11C on the front side of the vehicle body 2 is displayed. In the example illustrated in FIG. 17, a portion of the vehicle body 2 is photographed and included in the image captured by the image capturing device 10 (see reference sign 2IM). In the present embodiment, the display control unit 140 selects one imaging area 10C among the plurality of imaging areas 10C (11C to 16C) based on the operation (the operation signal of the shift lever position sensor 37S) of the shift lever 37. In the example illustrated in FIG. 17, since the shift lever 37 is operated so that the dump truck 1 is in the forward state, the display control unit 140 displays the image of the imaging area 11C on the front side of the dump truck 1 in the second image area 50B based on the detection result of the shift lever position sensor 37S. When the shift lever 37 is operated so that the dump truck 1 is in the backward state, the display control unit 140 displays the image of the imaging area 16C on the rear side of the dump truck 1 in the second image area 50B based on the detection result of the shift lever position sensor 37S. In this manner, in the present embodiment, the imaging area 10C displayed on the display device 50 is changed according to the operation of the shift lever 37.

One imaging area 10C may be selected among the plurality of imaging areas 10C (11C to 16C) according to the operation of the input device 80, and the selected imaging area 10C may be displayed on the display device 50. That is, the imaging area 10C displayed on the display device 50 may be changed according to the operation of the input device 80.

Various icons (symbols, figures, and the like) are displayed in the third image area 50C. In the present embodiment, an icon 51 indicating the imaging area 10C displayed in the second image area 50B among the six imaging areas 10C (11C to 16C) and an icon 52 indicating the operating state of the radar device 20 (21 to 28) are displayed. In the example illustrated in FIG. 17, since the radar device 20 operates normally, the icon 52 is displayed in a predetermined color (in this example, green). In a period where the controller 100 determines that the radar device 20 operates normally, the icon 52 does not blink but is lit green (continuously).

In the example illustrated in FIG. 17, three image areas are set on the screen of one display device 50. One image area may be set on the screen of one display device 50 according to the operation of the input device 80, and two image areas or four or more image areas may be set on the screen.

Figure 18:
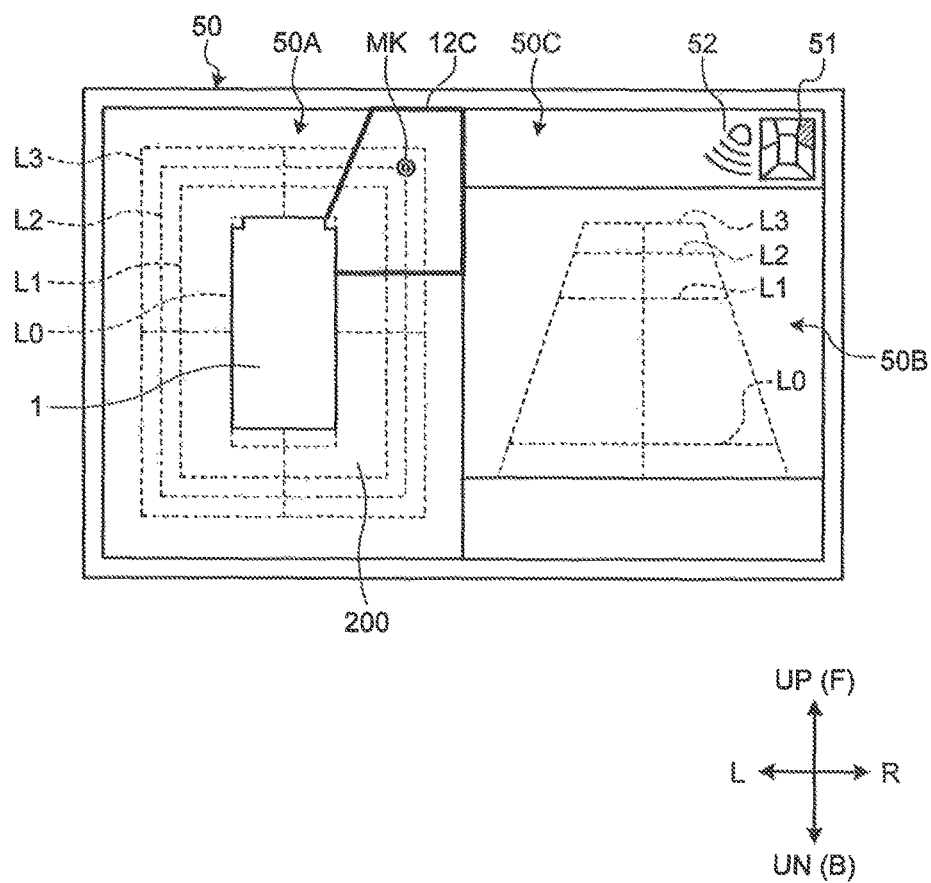
FIG. 18 is a diagram illustrating an example of the display device according to the present embodiment.

FIG. 18 illustrates a display example of the display device 50 when the radar device 20 has detected an object in a state where the radar device 20 operates normally. For example, when an object is present in the detection area 23C of the radar device 23 among the plurality of radar devices 20 (21 to 28), the radar device 23 detects the object. The detection result of the radar device 23 is output to the processing unit 220.

The processing unit 22C outputs the detection result of the radar device 23 to the position information generating unit 130. The position information generating unit 130 generates object position information indicating the position information of the object acquired by the radar device 23 and outputs the object position information to the display control unit 140.

The display control unit 140 displays a mark MK indicating an object on the display device 50 based on the object position information acquired from the position information generating unit 130. As illustrated in FIG. 18, the display control unit 140 displays the mark MK in the bird's-eye image 200 generated based on the image capturing result of the image capturing device 10.

In the present embodiment, the display control unit 140 displays identification information for identifying the detection area 20C where the object is present among the surroundings of the dump truck 1 based on the detection result of the radar device 20. In other words, identification information for identifying the radar device 20 that has detected the object among the plurality of radar devices 20 is displayed on the display device 50. In the present embodiment, the identification information is the imaging area 10C (or the detection area 20C), a character, a number, an icon, or a combination thereof displayed around the dump truck 1 on the screen of the display device 50, for example.

In the present embodiment, the identification information for identifying the radar device 20 that has detected the object is displayed so as to correspond to the imaging area 10C. That is, the identification information for identifying the radar device 20 that has detected the object among the plurality of radar devices 20 is not displayed so as to correspond to the detection area 20C but is displayed so as to correspond to the imaging area 10C.

Figure 19:
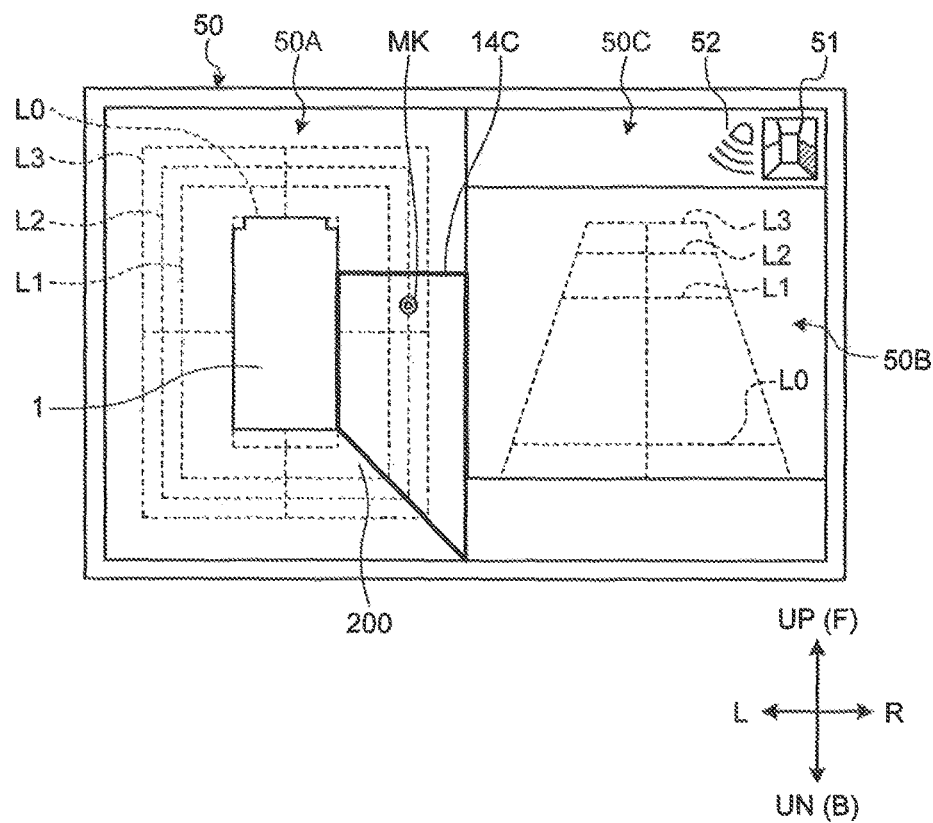
FIG. 19 is a diagram illustrating an example of the display device according to the present embodiment.

In the example illustrated in FIG. 18, the radar device 23 among the plurality of radar devices 20 (21 to 28) detects the object, and the object is present in an overlapping portion of the detection area 23C and the imaging area 12C. Due to this, as illustrated in FIG. 18, the display control unit 140 displays a frame image indicating the outline of the imaging area 12C. When the radar device 23 detects an object and the object is present in the overlapping portion of the detection area 23C and the imaging area 14C, the display control unit 140 displays a frame image indicating the outline of the imaging area 14C as illustrated in FIG. 19.

The frame image in which the mark MK is disposed may blink and may be displayed in a strong color such as red.

In this manner, in the present embodiment, the display device 50 displays the object detection result (the position of the mark MK) obtained by the radar device 20 using the imaging area 10C rather than using the detection area 20C.

<Operation of Surroundings Monitoring System>

Figure 20:
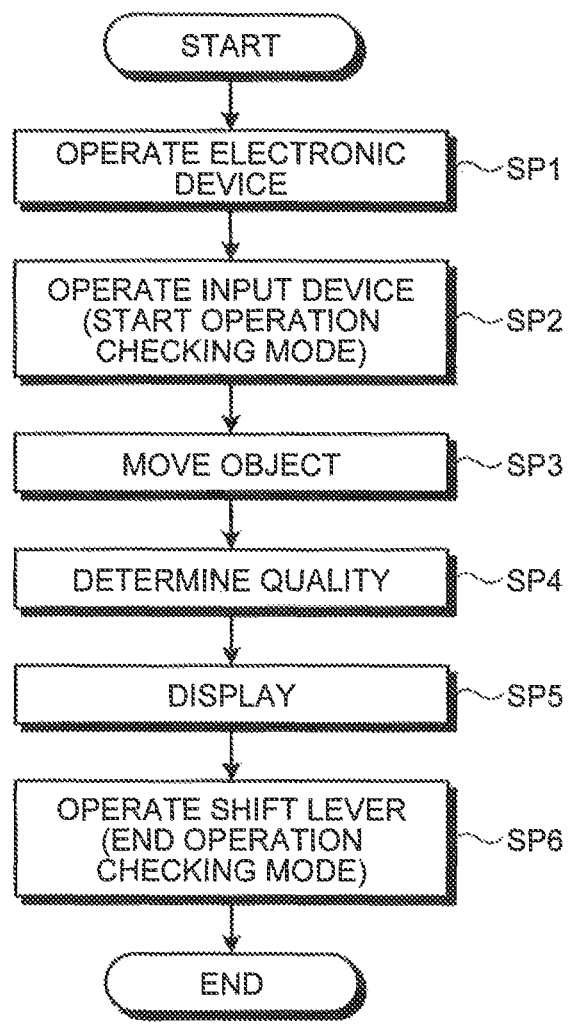
FIG. 20 is a flowchart illustrating an example of an inspection operation of the radar device according to the present embodiment.

Next, an example of the operation of the surroundings monitoring system 7 according to the present embodiment will be described. In the present embodiment, before the dump truck 1 starts working (operating), the radar device 20 is inspected (at start-up or on a daily basis). FIG. 20 is a flowchart illustrating an example of an inspection operation of the radar device 20. As illustrated in FIG. 20, the inspection operation includes: a step (step SP1) of operating electronic devices of the dump truck 1 including the radar device 20 and the controller 100 in the parking state of the dump truck 1; a step (step SP2) of operating the input device 80 in the parking state to generate a command signal indicating an operation checking mode (start-up inspection mode) for inspecting the radar device 20; a step (step S23) of moving an object at the surroundings of the dump truck 1 to arrange the detection area 20C of the radar device 20; a step (step SP4) of determining the quality of the operating state of the radar device 20 based on the detection result of the radar device 20; a step (step SP5) of displaying the detection area 20C of the radar device 20 of which the operating state is determined to be not good on the display device 50; and a step (step SP6) of operating the shift lever 37 to end the operation checking mode.

The operator gets on the cab 3 in order to start working. The operator operates the electric system of the dump truck 1 using an ignition key, for example (step SP1). With the operation of the ignition key, the internal combustion engine may operate, and the internal combustion engine may not operate but an accessory power source only may operate. When the electric system of the dump truck 1 operates, the electronic devices of the dump truck 1 including the controller 100, the display device 50, the input device 80, the shift lever position sensor 37S, the parking brake operating switch 37P, the image capturing device 10, and the radar device 20 are operated.

The inspection operation is performed in the parking state of the dump truck 1. In the present embodiment, with the operation of the parking brake operating switch 37P, the dump truck 1 enters into the parking state. Moreover, the inspection operation is performed in a large place where other object such as an obstacle is not present around the dump truck 1. The inspection operation is performed in an empty load state where no freight is loaded on the vessel 4. Moreover, the inspection operation is performed in a loading posture of the vessel 4. The inspection operation may be performed in a loaded state where freight is loaded on the vessel 4.

The inspection operation may be performed in a standing posture of the vessel 4. When the vessel 4 is in the standing state, the radar devices 25 and 26 for detecting the rear side of the vehicle body 2 stop operating.

Subsequently, the operator sets the dump truck 1 to an operation checking mode in order to inspect the radar devices 20 (21 to 28) (step SP2). The operation checking mode is a mode for inspecting the radar device 20. In the present embodiment, the operation checking mode starts when the input device 80 is operated. For example, when a display mode changeover switch and an obstacle check clear button on the screen of the display device 50 among the plurality of operation buttons of the input device 80 are pressed for three seconds or more simultaneously, a command signal for starting the operation checking mode is generated.

The command signal indicating the operation checking mode, generated with the operation of the input device 80 is output to the acquisition unit 120. The acquisition unit 120 transmits the command signal to the mode control unit 150. The mode control unit 150 sets the dump truck 1 to the operation checking mode. In this way, the operation checking mode operates (starts).

In this manner, in the present embodiment, the operation checking mode starts when the acquisition unit 120 of the controller 100 has acquired the command signal in the parking state of the dump truck 1.

Figure 21:
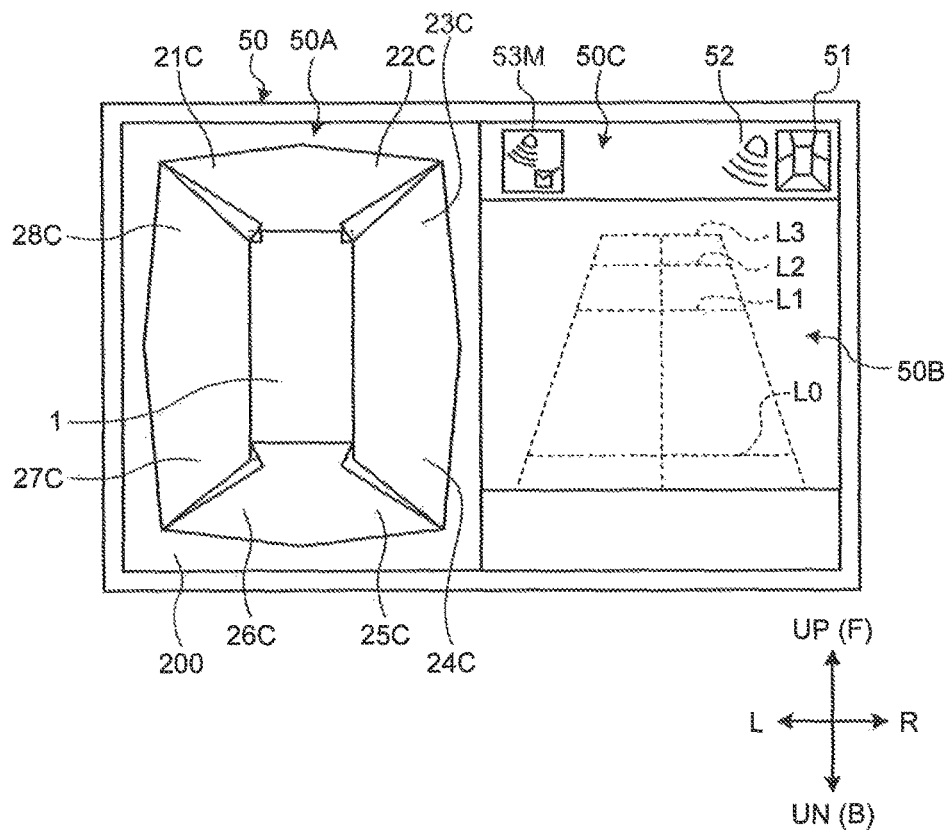
FIG. 21 is a diagram illustrating an example of the display device according to the present embodiment.

FIG. 21 illustrates a display example of the display device 50 immediately after the operation checking mode starts. After the acquisition unit 120 acquires the command, signal from the input device 80, the mode control unit 150 outputs a command signal for starting the operation checking mode to the display control unit 140.

As illustrated in FIG. 21, the display control unit 140 displays the dump truck 1 in the first image area 50A on the screen of the display device 50 and displays the detection areas 20C (21C to 28C) around the dump truck 1 in the first image area 50A on the screen. On the display device 50, the dump truck 1 and the detection areas 20C (21C to 28C) of the plurality of radar devices 20 (21 to 28) are displayed around the dump truck 1.

In the present embodiment, in the operation checking mode as well as the normal operation state, the display control unit 140 displays the bird's-eye image 200 of the surroundings of the dump truck 1 generated based on the image capturing result of the image capturing device 10 around the dump truck 1 on the display device 50. The display control unit 140 displays the detection areas 20C (21C to 28C) so as to overlap the bird's-eye image 200.

In the present embodiment, a figure indicating the detection area 20C is displayed. The entire surface of the detection area 20C is displayed in a yellow color, for example. A frame image indicating the outline of the detection area 20C may be displayed, and the detection area 20C may be displayed in a semi-transparent color so that both the detection area 20C and the bird's-eye image 200 are visible in a state where the detection area 20C and the bird's-eye image 200 overlap.

In the present embodiment, an icon 53M indicating an operation checking mode period is displayed in the third image area 50C. In the present embodiment, the icon 53M is displayed in a yellow color. Moreover, the icon 53M blinks. The icon 53M may be lit continuously.

After the operation checking mode starts and a display state illustrated in FIG. 21 is created on the display device 50, the operator moves an object around the dump truck 1 (step SP3).

Figure 22:
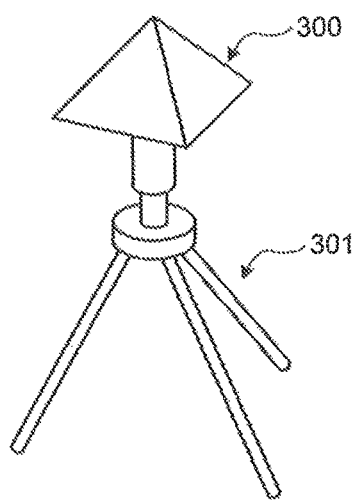
FIG. 22 is a schematic diagram illustrating an example of an object used in the inspection operation according to the present embodiment.

FIG. 22 is a schematic diagram illustrating an example of an object used in the inspection operation. In the present embodiment, a reflecting member 300 called a corner reflector is used as the object used in the inspection operation. The reflecting member 300 is supported by a support member 301 such as a tripod. The support member 301 may not be present. The reflecting member 300 is a triangular pyramidal member made from metal such as iron or aluminum. The reflecting member 300 has a reflecting portion (reflecting surface) capable of reflecting radio waves emitted from the radar device 20. The reflectivity (reflection intensity) of the reflecting portion of the reflecting member 300 with respect to radio waves is higher than the reflectivity (reflection intensity) of an object around the reflecting member 300. The object around the reflecting member 300 includes stones or the like in a mine.

Figure 23:
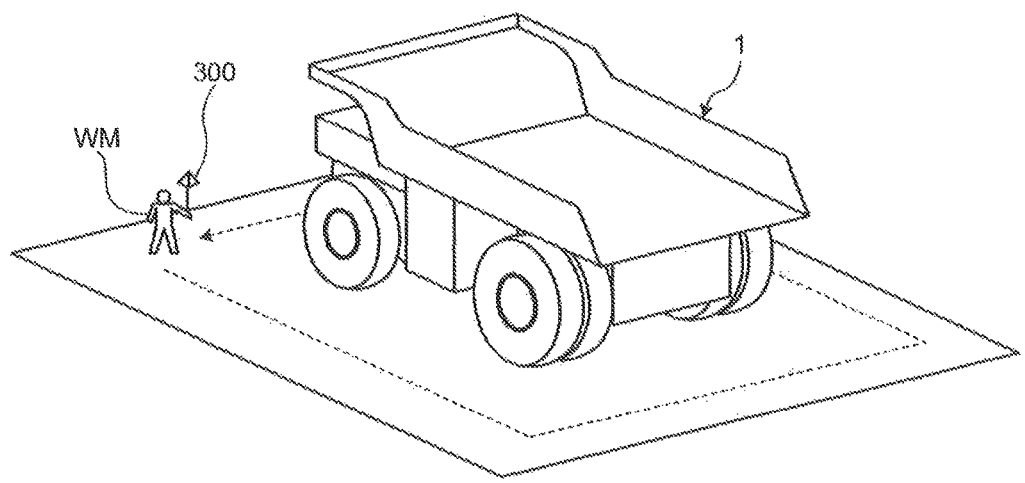
FIG. 23 is a schematic diagram illustrating an example of the inspection operation according to the present embodiment.

FIG. 23 is a schematic diagram illustrating an example of a state where an operation of moving the reflecting member 300 around the dump truck 1 is performed. As illustrated in FIG. 23, an operator WM walks around the dump truck 1 while holding the reflecting member 300. The operator WM moves while holding the reflecting member 300 so that the reflecting member 300 is disposed in the plurality of detection areas 20C, respectively.

The detection results of the plurality of radar devices 20 are output to the determining unit 210 of the controller 100. The determining unit 210 determines the quality of the operating state of the radar device 20 based on the detection result of the radar device 20 (step SP4). The determining unit 210 determines the quality of the operating states of the respective radar devices 20.

When the detection value (signal intensity) of the radar device 20 exceeds a predetermined threshold, the determining unit 210 determines that the radar device 20 is normal (the operating state is good). On the other hand, when the detection value of the radar device 20 is equal to or smaller than the predetermined threshold, the determining unit 210 determines that the radar device 20 is abnormal (the operating state is not good).

For example, a problem may occur in a system that transmits a detection signal of the radar device 20 to the controller 100, a problem may occur in the emitting portion or the receiving portion of the radar device 20, a foreign material such as mud may adhere to the emitting portion or the receiving portion of the radar device 20, and a foreign material such as mud may adhere to the protective member 84 for protecting the radar body 81, whereby the detection value of the radar device 20 may be equal to or smaller than the predetermined threshold. In the operation checking mode, an operation of finding these problems is performed.

The determination result of the determining unit 21C is output to the display control unit 140. The display control unit 140 displays the detection area 20C of the radar device 20 of which the operating state is determined to be not good by the determining unit 210 among the plurality of radar devices 20 on the display device 50 and does not display the detection area 20C of the radar device 20 of which the operating state is determined to be good (step SP5).

As described above with reference to FIG. 21, in an initial state of the operation checking mode, all detection areas 20C (21C to 28C) of the plurality of radar devices 20 (21 to 28) are displayed on the display device 50. The display control unit 140 removes the detection area 20C of the radar device 20 of which the operating state is determined to be good by the determining unit 210 from the screen of the display device 50 and does not remove the detection area 20C of the radar device 20 of which the operating state is determined to be not good but leaves (continuously displays) the detection area 20C on the display device 50.

Figure 24:
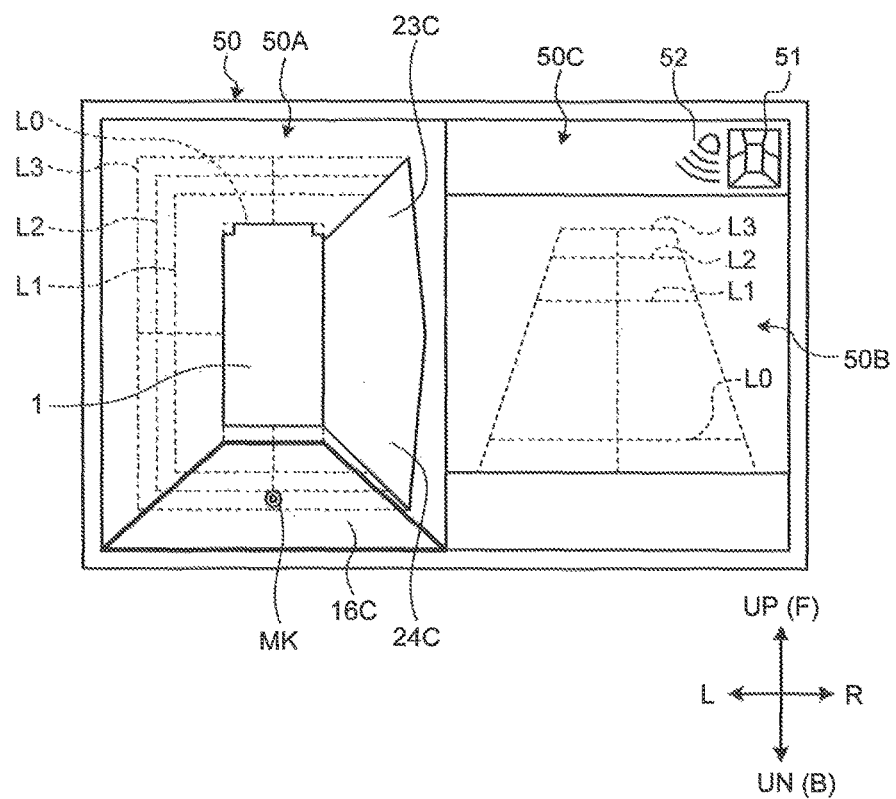
FIG. 24 is a diagram illustrating an example of a display device according to the present embodiment.

FIG. 24 illustrates a display example of the display device 50 when the reflecting member 300 moves around the dump truck 1 in the operation checking mode. The reflecting member 300 is sequentially disposed in the plurality of detection areas 20C (21C to 28C). When the operating state of the radar device 20 is good, the reflecting member 300 is disposed in the detection area 20C, whereby the detection area 20C is removed from the display device 50. When the operator WM has disposed the reflecting member 300 illustrated in FIG. 22 in the order of the detection areas 21C, 22C, and 23C, for example, the detection areas 21C, 22C, and 23C in which the reflecting member 300 is disposed are sequentially removed from the display device 50.

Figure 25:
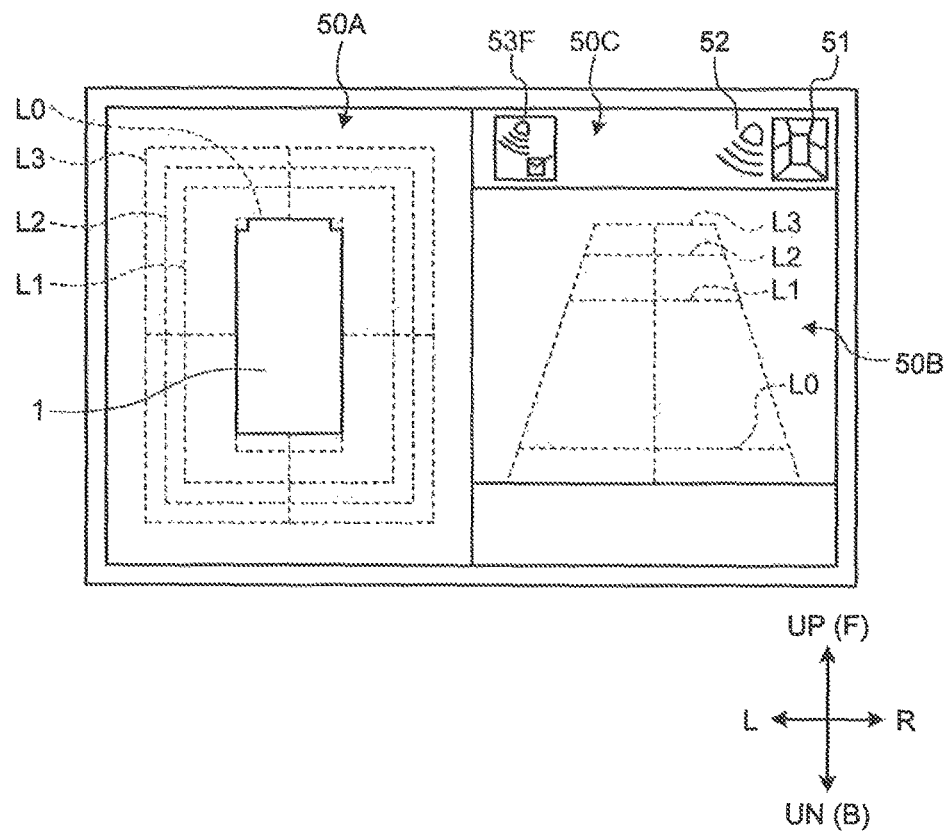
FIG. 25 is a diagram illustrating an example of the display device according to the present embodiment.

FIG. 25 illustrates a display example of the display device 50 after the reflecting member 300 has moved around the surroundings of the dump truck 1 in the operation checking mode and it has been determined that the operating states of all radar devices 20 are good. As illustrated in FIG. 25, when it is determined that the operating states of all radar devices 20 are good, the detection area 20C is not displayed in the first image area 50A of the display device 50. Moreover, an icon 53F indicating that the operating states of all radar devices 20 are good is displayed in the third image area 50C. The icon 53F is displayed in a different form from the icon 53M. In the present embodiment, the icon 53F is green, for example, and is lit continuously.

Figure 26:
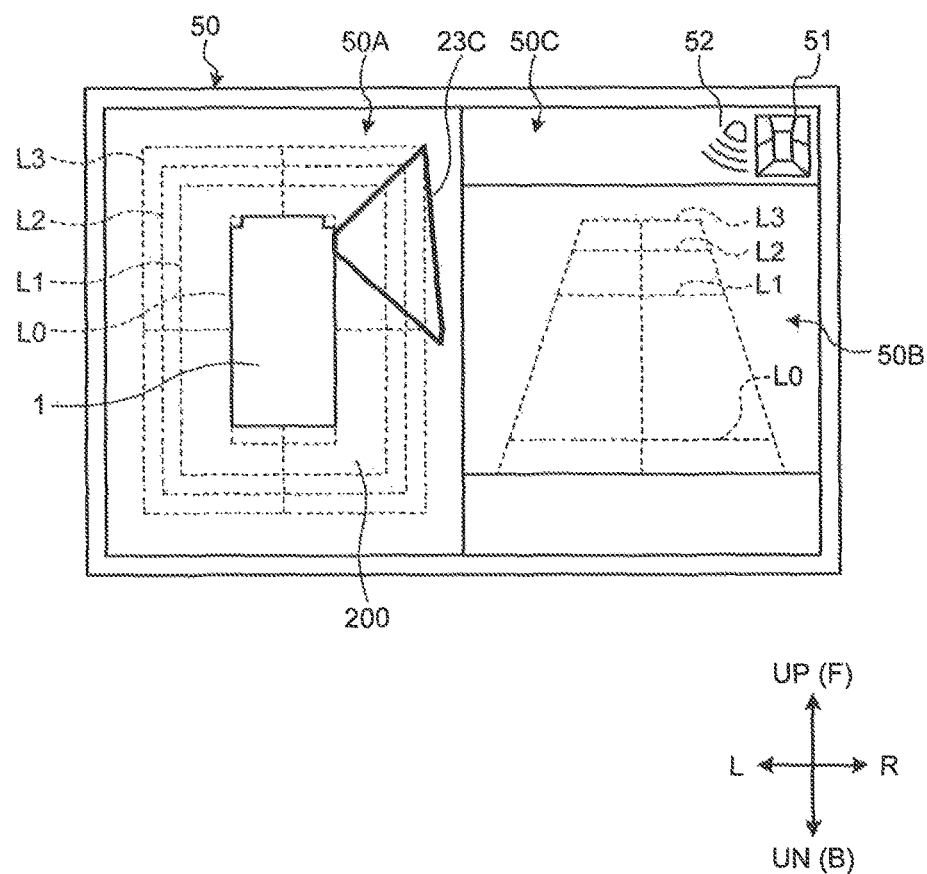
FIG. 26 is a diagram illustrating an example of the display device according to the present embodiment.

FIG. 26 illustrates a display example of the display device 50 after the reflecting member 300 has moved around the surroundings of the dump truck 1 in the operation checking mode and it has been determined that the operating state of the radar device 23 among the plurality of radar devices 20 (21 to 28) is not good. As illustrated in FIG. 26, the detection area 23C is displayed in the first image area 50A of the display device 50. The display control unit 140 displays the dump truck 1 on the screen of the display device 50 and displays the detection area 23C of the radar device 23 of which the operating state is determined to be not good at the surroundings of the dump truck 1 on the screen of the display device 50.

The operator WM having finished the operation of moving the reflecting member 300 around the dump truck 1 gets on the cab 3. The operator WM can recognize whether the operating states of all radar devices 21 to 28 are good by looking at the display device 50.

After finishing the inspection operation, the operator WM operates the shift lever 37 whereby the parking state is cleared. When the shift lever 37 is operated so that the dump truck 1 enters into the forward state or the backward state, the parking state is cleared. An operation signal indicating the operation of the shift lever 37 is output from the shift lever position sensor 37S to the acquisition unit 120 and the display control unit 140. The acquisition unit 120 outputs the operation signal to the mode control unit 150. Upon receiving the operation signal, the mode control unit 150 ends the operation checking mode and starts the normal operation state (step SP6). In this manner, in the present embodiment, when the parking state is cleared according to the operation of the shift lever 37, the operation checking mode ends and the normal operation state starts.

As described above with reference to FIG. 25, when the operator WM has recognized from the display device 50 that the operating states of all radar devices 20 are good, the operator WM may start a normal operation. The operator WM can start the travelling of the dump truck 1 while checking whether an object is present around the surroundings of the dump truck 1 based on the detection result (the mark MK) of the radar device 20 displayed on the display device 50. When the operating states of all radar devices 20 are good and the dump truck 1 is set to the normal operation state, the display device 50 displays such an image as described with reference to FIGS. 17 and 18. In this way, when the dump truck 1 starts or travels at a low speed, it is possible to reliably check the safety of the surroundings. As illustrated in FIGS. 17 and 18, when the operating states of all radar devices 20 are good and the dump truck 1 is set to the normal operation state, an icon (53F) indicating the operation checking mode is removed from the screen of the display device 50.

In the present embodiment, when the travelling speed of the dump truck 1 exceeds a threshold (for example, 15 km per hour), an image based on the image capturing result of the image capturing device 10 such as the bird's-eye image 200 is not displayed on the display device 50.

Moreover, when the travelling speed of the dump truck 1 exceeds the threshold (for example, 15 km per hour), the radar device 20 stops operating and the mark MK based on the detection result of the radar device 20 is not displayed on the display device 50.

As described above with reference to FIG. 26, when the operator WM has recognized the detection area 23C which is the identification information of the radar device 23 of which the operating state is determined to be not good by the determining unit 210 among the plurality of radar devices 20 from the display device 50, predetermined measures are taken. For example, measures such as dispatch request for a service man or repair or replacement of the radar device 23 are taken.

When the operating state of a partial radar device 20 among the plurality of radar devices 20 is determined to be not good, the operation checking mode ends and the normal operation state starts according to the operation of the shift lever 37. The operator WM can start a normal operation.

Figure 27:
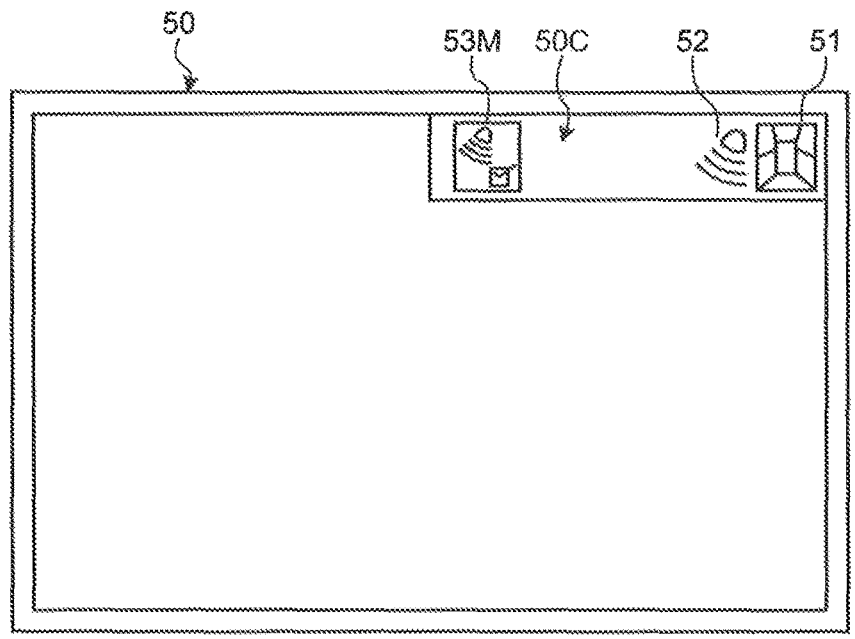
FIG. 27 is a diagram illustrating an example of the display device according to the present embodiment.

FIG. 27 illustrates a display example of the display device 50 when the dump truck 1 is in the normal operation state and the operating state of a partial radar device 20 among the plurality of radar devices 20 is determined to be not good.

As described above with reference to FIGS. 17 and 18, when it is determined that the operating states of all radar devices 20 are determined to be good, the icon (53F) is removed. However, when it is determined that the operating state of a partial radar device 20 among the plurality of radar devices 20 is not good, the icon 53M is displayed as illustrated in FIG. 27. The icon 53M is displayed in a different form from the icon 53F. In the present embodiment, the icon 53M is yellow, for example, and blinks. In this manner, in the normal operation state after the operation checking mode ends, the display device 50 displays the icon 53M which is warning information indicating the presence of a radar device which is determined to be not good in the operation checking mode.

In the operation checking mode, when the operator WM has not disposed the reflecting member 300 in all detection areas 20C but has disposed in a partial detection area 20C, the determining unit 20 determines that the operating state of the radar device 20 in the detection area 20C in which the reflecting member 300 is not disposed is not good. In such a case, in the normal operation state after the operation checking mode ends, the display device 50 displays the icon 53M which is warning information indicating the presence of the radar device 20 which is determined to be not good in the operation checking mode.

<Storage Unit>

In the present embodiment, the execution period of the operation checking mode and the detection result (the quality of the operating state) of the radar device 20 in the operation checking mode are stored in the storage unit 160. The controller 100 includes the timer 170 and stores the execution period of the operation checking mode (inspection operation) and the detection result (quality of the operating state) of the radar device 20 in the operation checking mode in the storage unit 160 in correlation with time. In this way, it is possible to analyze the performance of the radar device 20 using the information stored in the storage unit 160. The timer 170 has a calendar clock function. The calendar clock function is a function of measuring year, month, day, hour, minute, and second.

<Display During Failure (Abnormality) of Radar Device>

Figure 28:
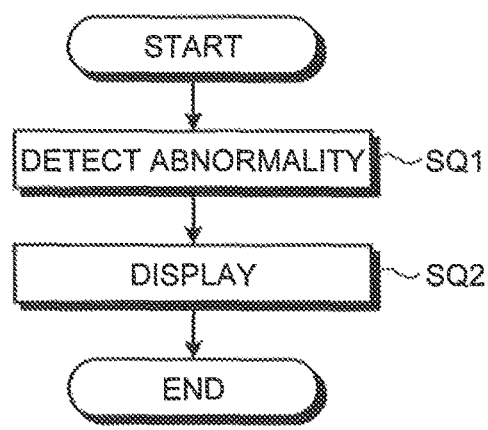
FIG. 28 is a flowchart illustrating an example of the operation of the surroundings monitoring system according to the present embodiment.

Next, a display example of the display device 50 when an abnormality occurs in the radar device 20 will be described. FIG. 28 is a flowchart illustrating an example of the operation of the surroundings monitoring system 7 when an abnormality occurs in the radar device 20. As illustrated in FIG. 28, a step (step SQ1) of detecting an abnormality of the radar device 20 and a step (step SQ2) of displaying the detection area 20C of the radar device 20 in which an abnormality has occurred on the display device 50 are executed.

In the normal operation state, an abnormality may occur in the radar device 20 due to a certain reason. The abnormality of the radar device 20 includes a failure or a damage of the radar device 20. Moreover, the abnormality of the radar device 20 includes a temperature abnormality and a voltage abnormality of the radar device 20, a malfunction due to noise (internal and external noise), and a failure (damage) of hardware such as a semiconductor chip. Moreover, the abnormality of the radar device 20 includes a disconnection of an electric cable connected to the radar device 20. A temperature abnormality can be detected using a temperature sensor provided in the radar device 20. A voltage abnormality can be detected using a voltage meter capable of detecting a voltage applied to the radar device 20.

As illustrated in FIG. 3, in the present embodiment, the controller 100 includes the abnormality detecting unit 23C. The abnormality detecting unit 23C can detect the abnormalities described above and can obtain abnormality information. When it is determined that an abnormality has occurred in the radar device 20, the abnormality detecting unit 23C outputs an abnormality signal indicating the abnormality to the display control unit 140 (step SQ1).

Figure 29:
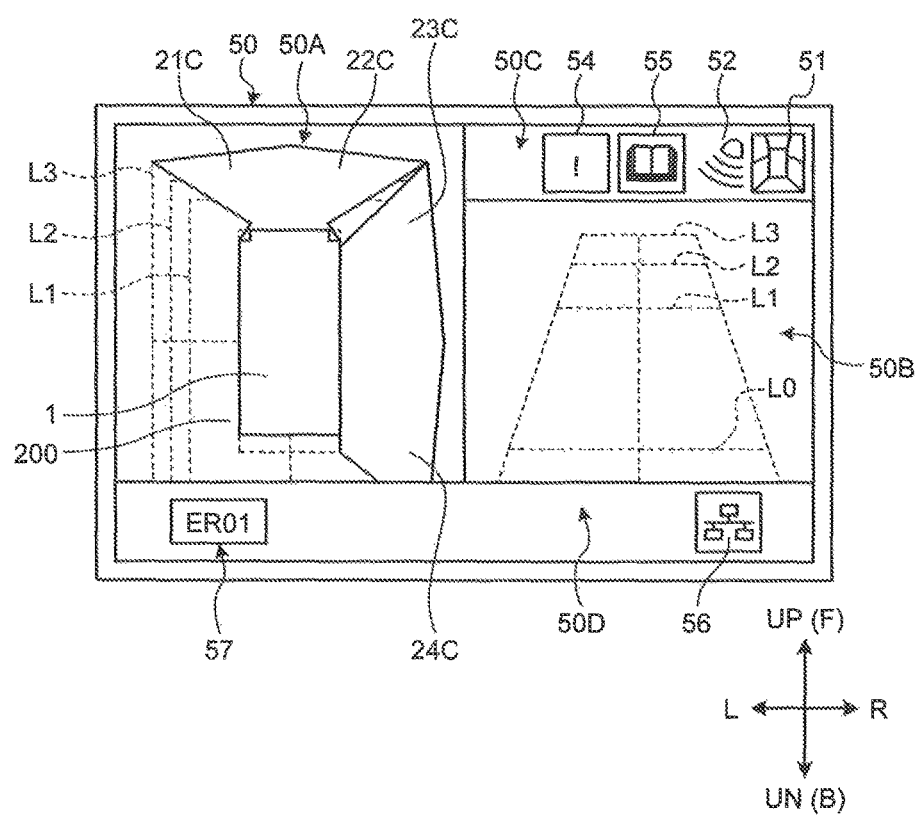
FIG. 29 is a diagram illustrating an example of the display device according to the present embodiment.

FIG. 29 illustrates a display example of the display device 50 when an abnormality occurs in the radar device 20. As illustrated in FIG. 29, the display control unit 140 displays the dump truck 1 in the first image area 50A of the screen of the display device 50 and displays the detection area 20C of the radar device 20 in which an abnormality has occurred around the dump truck 1 on the screen of the display device 50.

FIG. 29 illustrates an example in which an abnormality has occurred in the radar devices 21, 22, 23, and 24, and the detection areas 21C, 22C, 23C, and 24C of the radar devices 21, 22, 23, and 24 in which the abnormality has occurred are displayed around the dump truck 1 on the screen of the display device 50.

As illustrated in FIG. 29, the display control unit 140 displays the bird's-eye image 200 of the surroundings of the dump truck 1 around the dump truck 1 and displays the detection areas 21C, 22C, 23C, and 24C on the display device 50 so as to overlap the bird's-eye image 200.

Figure 30:
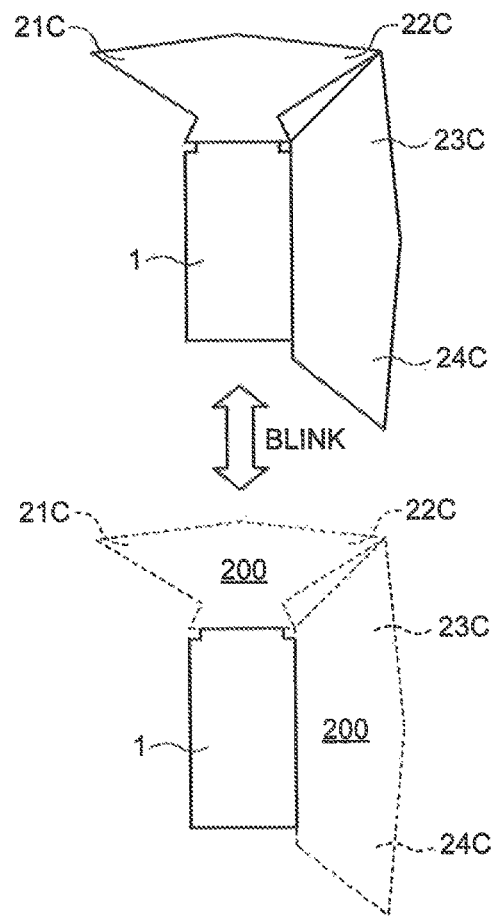
FIG. 30 is an example of the display device according to the present embodiment and is a schematic diagram illustrating that a detection area flickers on and off.

In the present embodiment, as illustrated in FIG. 30, the display control unit 140 causes the detection areas 21C, 22C, 23C, and 24C to blink on the screen of the display device 50. The display control unit 140 displays the detection areas 21C, 22C, 23C, and 24C in a different color from that of the operation checking mode. In the present embodiment, the detection area of the radar device 20 of which the operating state is determined to be not good in the operation checking mode is displayed in a yellow color, and the detection area 20C of the radar device 20 in which it is determined that an abnormality has occurred is displayed in a red color.

The operation of causing the detection areas 21C, 22C, 23C, and 24C to blink includes repeating an operation of displaying the detection areas 21C, 22C, 23C, and 24C and an operation of not displaying the detection areas 21C, 22C, 23C, and 24C. In the display period, a portion of the bird's-eye image 200 is concealed (not visible) by the detection areas 21C, 22C, 23C, and 24C on the display device 50. In a non-display period, the bird's-eye image 200 which was concealed by the detection areas 21C, 22C, 23C, and 24C is displayed (visible) on the display device 50.

Figure 31:
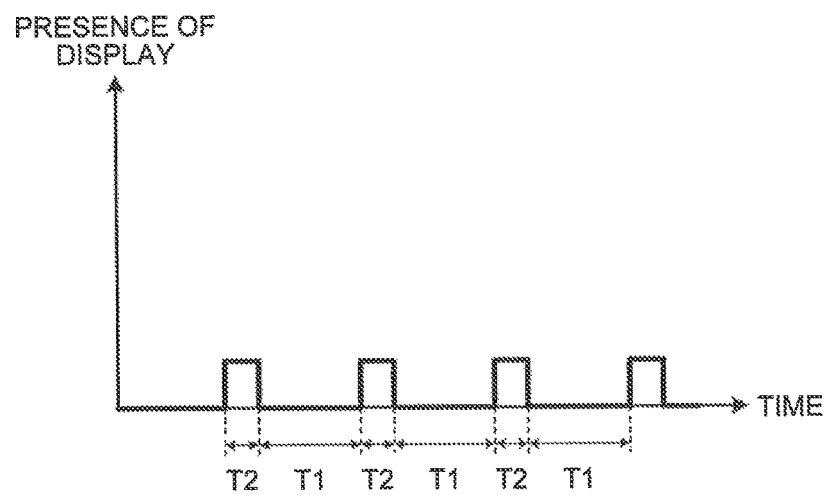
FIG. 31 is a timing chart for describing the operation of the display device according to the present embodiment.

FIG. 31 is a timing chart illustrating an example of the operation of not displaying the detection areas 21C, 22C, 23C, and 24C and the operation of displaying the detection areas. As illustrated in FIG. 31, a non-display period T1 is longer than a display period T2. Due to this, a period in which a portion of the bird's-eye image 200 is concealed by the detection areas 21C, 22C, 23C, and 24C becomes short, and the bird's-eye image 200 becomes easy to be recognized in a situation where the detection areas 21C, 22C, 23C, and 24C are displayed.

Figure 32:
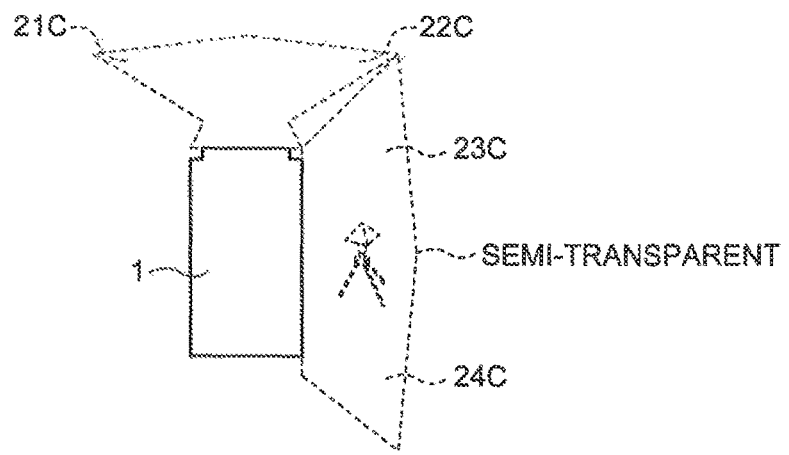
FIG. 32 is a diagram illustrating an example of the display device according to the present embodiment.

FIG. 32 illustrates a display example of the detection areas 21C, 22C, 23C, and 24C of the radar devices 21, 22, 23, and 24 in which an abnormality has occurred. The display control unit 140 may display the detection areas 21C, 22C, 23C, and 24C on the screen of the display device 50 in a semi-transparent manner so that both the detection areas 21C, 22C, 23C, and 24C and the bird's-eye image 200 are visible in a state where the detection areas 21C, 22C, 23C, and 24C and the bird's-eye image 200 overlap on the screen of the display device 50. By doing so, the bird's-eye image 200 also becomes easy to be recognized in a situation where the detection areas 21C, 22C, 23C, and 24C are displayed.

Returning to FIG. 29, when it is determined that an abnormality has occurred in the radar device 20, the display control unit 140 displays icons 54 and 55 indicating that an abnormality has occurred in the third image area 50C. Further, the display control unit 140 sets a fourth image area 50D, displays an icon 56 and an error code 57 in the fourth image area 50D. ER01 indicated by the error code 57 is an example of a code indicating the content of an abnormal phenomenon and the position where the abnormality has occurred.

Figure 33:
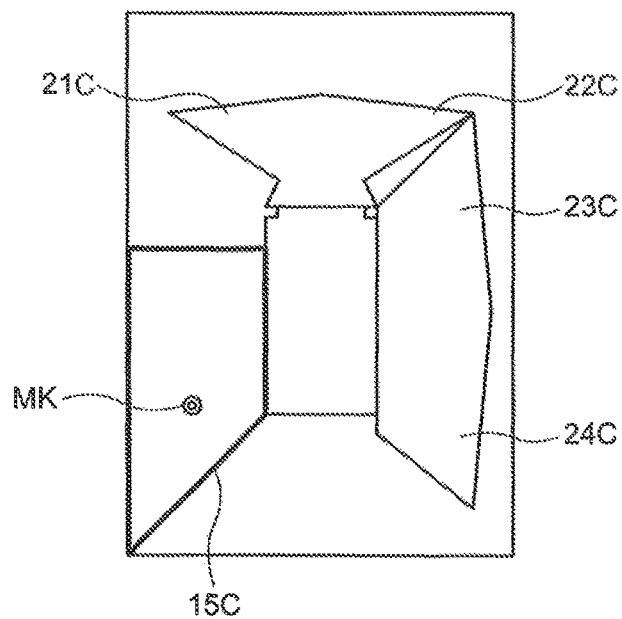
FIG. 33 is a diagram illustrating an example of the display device according to the present embodiment.

In the example illustrated in FIG. 29, although an abnormality has occurred in the radar devices 21, 22, 23, and 24 in the normal operation state, the radar devices 25, 26, 27, and 28 are normal. Thus, for example, when the radar device 27 has detected an object, the detection areas 21C, 22C, 23C, and 24C and a frame image indicating the outline of the imaging area 15C in which an object is present are displayed on the display device 50 as illustrated in FIG. 33. The imaging area 15C is the imaging area 10C that overlaps the detection area 27C of the radar device 27 that has detected the object, among the plurality of imaging areas 10C (11C to 16C).

On the screen of the display device 50, the form of the imagine area 10C (11C to 16C) is different from the form of the detection area 20C (21C to 28C). The form includes an outline, a size, and a design on the screen. In the present embodiment, the radar devices 21, 22, 23, and 24 in which an abnormality has occurred are displayed on the screen of the display device 50 using the detection areas 21C, 22C, 23C, and 24C. The normal radar device 27 that has detected an object is displayed on the screen of the display device 50 using the imaging area 15C. In this manner, in the present embodiment, the display control unit 140 displays the detection area 20C of the radar device 20 in which an abnormality has occurred in a different ions from the detection area 20C (the imaging area 10C) of the normal radar device 20 that has detected the object. Moreover, in the present embodiment, the display control unit 140 displays the detection area 20C of the radar device 20 in which an abnormality has occurred among the plurality of radar devices 20 and the detection area 20C (the imaging area 15C) of the normal radar device 27 that has detected the object in different forms at the same time. Due to this, the operator WM can easily distinguish the radar device 20 in which an abnormality has occurred and the radar device 20 that operates normally. Moreover, the operator WM can acquire a plurality of items of information simultaneously on one screen.

As described above, the display control unit 140 displays the radar device 20 that has detected an object in the normal operation state using the imaging area 10C and displays the radar device 20 that is determined to be not good in the operation checking mode using the detection area 20C. In this manner, since the display device 50 displays the identification information of the radar device 20 that has detected an object in the normal operation state before the operation checking mode starts or after the operation checking mode ends and the identification information of the radar device 20 that is determined to be not good in the operation checking mode in different forms, the operator WM can easily distinguish such a difference.

In the normal operation state, when an abnormality occurs in the radar device 20 during high-speed travelling of the dump truck 1, images are not displayed in the first and second image areas 50A and 50B as illustrated in FIG. 29. However, the icons 54, 55, and 56, the error code 57, and the like are displayed in the third and fourth image areas 50C and 50D.

Such identification information (the detection areas 21C to 24C) of the radar device 20 (21 to 24) in which an abnormality has occurred, as illustrated in FIG. 29 may be displayed when the dump truck 1 travels at a high speed in the normal operation state. When the abnormality detecting unit 230 has detected an abnormality of the radar device 20 (21 to 24), the display control unit 140 may display an image including the bird's-eye image 200 of the first image area 50A and the detection areas 21C, 22C, 23C, and 24C on the display device 50 as illustrated in FIG. 29. In this way, even when the dump truck 1 travels at a high speed, the operator WM can recognize the radar devices 21 to 24 in which an abnormality has occurred.

By operating the forced display button of the input device 80, the identification information (the detection areas 21C to 24C) of the radar devices 21 to 24 in which an abnormality has occurred may be displayed even when the dump truck 1 travels at a high speed in the normal operation state.

As described above, according to the present embodiment, in the operation checking mode for inspecting the radar device 20, the identification information of the radar device 20 of which the operating state is determined to be not good by the determining unit 210 is displayed on the display device 50. Therefore, it is possible to suppress the operator WM from working continuously without recognizing a situation where the radar device 20 does not operate normally.

According to the present embodiment, in the normal operation state, the identification information of the radar device 20 in which the abnormality detecting unit 23C determines that an abnormality has occurred is displayed on the display device 50. Therefore, it is possible to suppress the operator WM from working continuously without recognizing a situation where an abnormality has occurred in the radar device 20.

Thus, when a faulty radar device 20 is present, the operator WM can execute predetermined measures such as repair and work continuously carefully while recognizing the presence of the faulty radar device 20. Thus, an object present at the surroundings of the dump truck 1 is suppressed from contacting the dump truck 1. For example, it is possible to suppress a problem in which the dump truck 1 drags an object when the dump truck 1 starts or travels at a low speed.

In this manner, in the present embodiment, the surroundings monitoring system 7 can assist the operator WM in recognizing the state of the radar device 20 using the display device 50.

In the present embodiment, a plurality of radar devices 20 is disposed so that different areas of the surroundings of the dump truck 1 are detected, and the controller 100 can determine the quality of the operating states of the respective radar devices 20. In this way, the operator WM can recognize the quality of the operating states of the individual radar devices 20.

In the present embodiment, when the operating state of the radar device 20 is not good or an abnormality occurs in the radar device 20, the dump truck 1 is displayed on the screen of the display device 50, and the radar device 20 of which the operating state is not good or the detection area 20C of the radar device 20 in which an abnormality has occurred is displayed around the dump truck 1. Due to this, the surroundings monitoring system 7 can visually appeal the detection area 20C of the faulty or abnormal radar device 20 to the operator WM. Moreover, the operator WM can immediately understand the detection area 20C of the radar device 20 of which the operating state is not good or abnormal. Due to this, the burden and stress on the operator WM are reduced, and the operator WM can work safely.

In the present embodiment, the bird's-eye image 200 of the surroundings of the dump truck 1 generated based on the image capturing result of the image capturing device 10 is displayed on the screen of the display device 50 around the dump truck 1, and the detection area 20C of the radar device 20 of which the operating state is not good or abnormal is displayed so as to overlap the bird's-eye image 200. In this way, when an object is present in the detection area 20C, the operator WM can recognize the image (optical image) of the object based on the image capturing result of the image capturing device 10.

In the present embodiment, the surroundings monitoring system 7 can detect all objects at the surroundings of the dump truck 1 using both the radar device 20 and the image capturing device 10 and can sufficiently assist the operator WM in recognizing the objects. The radar device 20 can detect an object in a wider range (further range) than the image capturing device 10, and the display device 50 can immediately appeal the position of the object to the operator WM using the mark MK. The image capturing device 10 can allow the operator WM to recognize the image (optical image) of the object.

For example, in the operation checking mode, both the information from the radar device 20 and the information from the image capturing device 10 are displayed on the display device 50. Due to this, for example, even if it is recognized that an object (the reflecting member 300) is present around the dump truck 1 based on the image capturing result of the image capturing device 10, when the radar device 20 has not detected the object, the operator WM can determine that the operating state of the radar device 20 is not good. Similarly, even if it is recognized that an object (the reflecting member 300) is not present around the dump truck 1 based on the image capturing result of the image capturing device 10, when the radar device 20 has output a detection result indicating that an object is present, the operator WM can determine that the operating state of the radar device 20 is not good. In this manner, the operator WM can check the accuracy of the start-up inspection based on both the information from the radar device 20 and the information from the image capturing device 10 displayed on the display device 50.

In the present embodiment, in the operation checking mode, the display device 50 displays the detection area 20C of the radar device 20 that is determined to be not good and does not display the detection area 20C of the detection device 20 that is determined to be good. Due to this, the operator WM can immediately recognize the radar device 20 of which the operating state is good and the radar device 20 of which the operating state is not good.

In the present embodiment, in the initial state of the operation checking mode, the display device 50 displays the detection areas 20C of the respective radar devices 20 and removes the detection area 20C of the radar device 20 of which the operating state is determined to be good by the determining unit 210. Due to this, the operator WM can reliably recognize the radar device 20 of which the operating state is good.

In the present embodiment, the operation checking mode starts when the command signal in the parking state of the dump truck 1 is acquired. Due to this, it is possible to safely perform the inspection operation including an operation of moving the reflecting member 300 around the dump truck 1. Moreover, when the operation checking mode ends when the parking state is cleared, the operation checking mode can smoothly proceed to the normal operation state.

In the present embodiment, even when the normal operation state starts without repairing the radar device 20 of which the operating state is determined to be not good after the operation checking mode ends, the display device 50 displays the warning information (in the present embodiment, the icon 53M illustrated in FIG. 27) indicating the presence of the radar device 20 which is determined to be faulty in the operation checking mode. Due to this, even when the normal operation state starts, it is possible to allow the operator WM to continuously recognize the presence of the radar device 20 of which the operating state is not good.

In the present embodiment, the display device 50 displays the identification information of the radar device 20 that has detected an object in the normal operation state and the identification information of the radar device 20 that is determined to be faulty in the operation checking mode in different forms.

In the present embodiment, the detection area 20C of the radar device 20 in which an abnormality has occurred in the normal operation state and the detection area 20C (the imaging area 10C) of the normal radar device 20 that has detected an object are displayed in different forms. Due to this, the operator WM can properly recognize whether the detection area displays the abnormal radar device 20 or the object detection result. Moreover, since the detection area 20C of the radar device 20 in which an abnormality has occurred among the plurality of radar devices 20 and the detection area 20C (the imaging area 10C) of the normal radar device 20 that has detected an object are displayed in different forms at the same time, the operator WM can properly recognize a plurality of items of information at a time.

In the present embodiment, the execution period of the operation checking mode and the detection results of the radar device 20 in the operation checking mode are stored in the storage unit 160. Due to this, it is possible to analyze the performance of the radar device 20 using the information stored in the storage unit 160.

In the present embodiment, in the normal operation state, when an abnormality occurs in the radar device 20, the display device 50 causes the detection area 20C on the screen to blink. In this manner, the surroundings monitoring system 7 can visually appeal the presence of the radar device 20 in which an abnormality has occurred. Moreover, since the detection area 20C blinks, even when the detection area 20C is displayed so as to overlap the bird's-eye image 200 displayed on the screen of the display device 50, the display device 50 can allow the operator WM to recognize the bird's-eye image 200 in the non-display period of the blinking detection area 20C.

In the present embodiment, when the detection area 20C blinks, the non-display period where the detection area 20C is not displayed is longer than the display period where the detection area 20C is displayed. Due to this, even when the detection area 20C is displayed so as to overlap the bird's-eye image 200, the display device 50 can allow the operator WM to sufficiently recognize the bird's-eye image 200 in the non-display period of the blinking detection area 20C.

In the normal operation state, when an abnormality occurs in the radar device 20, the display device 50 may display the detection area 20C on the screen in a semi-transparent manner. Due to this, even when the detection area 20C is displayed so as to overlap the bird's-eye image 200, the display device 50 can allow the operator WM to sufficiently recognize both the detection area 20C and the bird's-eye image 200.

In the above-described embodiment, the identification information of the radar device 20 of which the operating state is determined to be not good in the operation checking mode is displayed using the imaging area 10C. However, the identification information may be displayed using the detection area 20C.

In the above-described embodiment, the imaging area 10C (or the detection area 20C) is displayed around the dump truck 1 on the screen of the display device 50 as the identification information of the radar device 20 of which the operating state is determined to be not good in the operation checking mode. A character, a number, or an icon may be used as the identification information of the radar device 20 of which the operating state is determined to be not good. For example, when the radar device 20 of which the operating state is determined to be not good in the operation checking mode among the plurality of radar devices 20, a character indicating "the operating state of the radar device 23 is not good" may be displayed on the screen of the display device 50.

In the above-described embodiment, the detection device 20 is a radar device. The detection device may detect an object around the dump truck 1 in a non-contacting manner. The detection device may be a laser device that detects an object based on a laser beam emitted to an object, for example.

In the above-described embodiment, the display device 50 displays both the mark MK (and icons indicating the detection result of the radar device 20 and the image (including the bird's-eye image 200) indicating the image capturing result of the image capturing device 10. However, the display device 50 may not display the image capturing result of the image capturing device 10. The dump truck 1 may not include the image capturing device 10.

In the above-described embodiment, the work vehicle 1 is a dump truck. The work vehicle 1 may be an excavator including a lower travelling structure, an upper revolving structure, and a working machine. In the excavator, an image capturing device, a radar device, and the like may be provided in the upper revolving structure.

While the present embodiment has been described, the present embodiment is not limited to the above-described content. Further, the constituent elements described above include those which are easily conceived by persons skilled in the art, those which are substantially identical thereto, and those in a scope of so-called equivalents. Further, the above-described constituent elements may be appropriately combined with each other. Furthermore, the constituent elements may be omitted, replaced, or modified in various forms in the scope without departing from the spirit of the present embodiment.

REFERENCE SIGNS LIST

1 Dump Truck
2 Vehicle Body
2a Lower Deck
2b Upper Deck
2c Movable Ladder
2d Inclined Ladder
2e Guardrail
2f Frame
2g Front Fender
3 Cab
3a Post
3b Post
3c Post
3d Post
4 Vessel
4F Flange Portion
5 Traveling Device
5A Front Wheel
5B Rear Wheel
7 Surroundings Monitoring System
8 Operation Panel
10 (11 to 16) Image Capturing Device
10C (11C to 16C) Imaging Area
20 (21 to 28) Radar Device
20C (21C to 28C) Detection Area
31 Driver's Seat
32 Steering Wheel
33 Dash Cover
34 Wireless Device
35A Accelerator Pedal
35Bf Brake Pedal
35Bs Secondary Brake Pedal
36 Retarder
37 Shift Lever
37S Shift Lever Position Sensor
37P Parking Brake Operating Switch
50 Display Device
50A First Image Area
50B Second Image Area
50C Third Image Area
50D Fourth Image Area
51 Icon
52 Icon
53 Icon
53F Icon
53M Icon
54 Icon
55 Icon
56 Icon
57 Error Code
62 Air Cleaner
70 Cross Member
71 Rear Axle
80 Input Device
81 Radar Body
82 Cable
83 Protective Member
84 Protective Member
100 Controller
110 Bird's-Eye Image Combining Unit
120 Acquisition Unit
130 Position Information Generating Unit
140 Display Control Unit
150 Mode Control Unit
200 Bird's-Eye Image
21C Determining Unit
22C Processing Unit
23C Abnormality Detecting Unit
300 Reflecting Member
301 Support Member
B Rear Side
F Front Side
L Left Side
MK Mark
R Right Side
UN Lower Side
UP Upper Side
WM Operator

The invention claimed is:

1. A surroundings monitoring system comprising:
image capturing devices disposed in a work vehicle and configured to image an imaging area thereof around the work vehicle;
detection devices disposed in the work vehicle and configured to be able to detect an object located in detection areas thereof around the work vehicle;
an abnormality detecting unit configured to detect an occurrence of an abnormality in the body of at least one detection device of the detection devices and to output an abnormality signal indicating the occurrence of the abnormality; and
a display device disposed in the work vehicle and configured to display the work vehicle on a screen and display a bird's-eye image, which is generated based on image capturing results of the image capturing devices, around the work vehicle on the screen,
wherein the display device displays the detection area of at least one detection device which is operating in an abnormal state and the detection area of at least one detection device which is operating in a normal state among the detection areas of the detection devices in different forms on the screen, and the display device displays the detection area of at least one detection device which is operating in an abnormal state so as to overlap the bird's-eye image, so that both the detection areas and the bird's-eye image are visible.

2. The surroundings monitoring system according to claim 1, wherein
the display device causes the detection area on the screen to blink.

3. The surroundings monitoring system according to claim 1, wherein
the display device repeats a display operation of displaying the detection area and a non-display operation of not displaying the detection area,
the display device conceals at least a portion of the bird's-eye image by the detection areas in a period of the display operation and displays the concealed portion of the bird's-eye image in a period of the non-display operation, and
the period of the non-display operation is longer than the period of the display operation.

4. The surroundings monitoring system according to claim 1, wherein
the display device displays the detection area in a semi-transparent manner so that both the detection area and the bird's-eye image are visible in a state where the detection area and the bird's-eye image overlap.

5. A work vehicle comprising the surroundings monitoring system according to claim 1.

6. A surroundings monitoring method comprising:
capturing images of imaging areas around a work vehicle by image capturing devices disposed in the work vehicle;
detecting an object located in a detection area around a work vehicle by at least one detection device of the detection devices disposed in the work vehicle;
detecting an occurrence of an abnormality in the body of at least one detection device of the detection devices;
outputting an abnormality signal indicating the occurrence of the abnormality; and
displaying the work vehicle on a screen of a display device disposed in the work vehicle and displaying the bird's-eye image, which is generated based on the captured images, around the work vehicle on the screen of the display device,
wherein
the display device displays the detection area of at least one detection device which is operating in an abnormal state based on the abnormality signal and the detection area of at least one detection device which is operating in a normal state and have detected the object among the detection areas of the plurality of detection devices in different forms at a same time on the screen of the display device and
the display device displays the detection area of at least one detection device which is operating in an abnormal state so as to overlap the bird's-eye image, so that both the detection areas and the bird's-eye image are visible.

7. The surroundings monitoring system according to claim 1, wherein the abnormality includes at least one of a temperature abnormality, a voltage abnormality, a malfunction due to noise, and a failure of hardware in the at least one detection device which is operating in the abnormal state.

8. The surroundings monitoring system according to claim 1, wherein the display device displays the imaging area and the detection area in different forms on the screen.

9. The surroundings monitoring method according to claim 6, wherein the abnormality includes at least one of a temperature abnormality, a voltage abnormality, a malfunction due to noise, and a failure of hardware in the at least one detection device which is operating in the abnormal state.

10. The surroundings monitoring method according to claim 6, further comprising: displaying the imaging area and the detection area in different forms on the screen of the display device.

* * * * *